(12) United States Patent
Emert et al.

(10) Patent No.: US 9,923,371 B1
(45) Date of Patent: Mar. 20, 2018

(54) SHARED RESOURCE SYSTEM

(71) Applicant: Rosendin Electric, Inc., San Jose, CA (US)

(72) Inventors: Steven Emert, Hayward, CA (US); William Paul Mazzetti, Jr., San Francisco, CA (US)

(73) Assignee: Rosendin Electric, Inc., San Jose, CA (US)

( * ) Notice: Subject to any disclaimer, the term of this patent is extended or adjusted under 35 U.S.C. 154(b) by 435 days.

(21) Appl. No.: 14/712,797

(22) Filed: May 14, 2015

Related U.S. Application Data

(60) Provisional application No. 62/036,875, filed on Aug. 13, 2014, provisional application No. 62/076,346, filed on Nov. 6, 2014.

(51) Int. Cl.
 *H02J 3/12* (2006.01)
 *H02J 3/38* (2006.01)
(52) U.S. Cl.
 CPC ..................... *H02J 3/12* (2013.01)
(58) Field of Classification Search
 CPC ........................................................ H02J 3/12
 USPC ........................................................... 307/18
 See application file for complete search history.

(56) References Cited

U.S. PATENT DOCUMENTS

| | | |
|---|---|---|
| 5,672,920 A | 9/1997 | Donegan et al. |
| 6,008,971 A | 12/1999 | Duba et al. |
| 8,681,479 B2 | 3/2014 | Englert et al. |
| 2010/0102633 A1 | 4/2010 | Seaton |
| 2011/0084672 A1 | 4/2011 | La Buschagne et al. |
| 2012/0326504 A1 | 12/2012 | Ballantine et al. |
| 2013/0293017 A1 | 11/2013 | Englert et al. |
| 2014/0098470 A1 | 4/2014 | Robinson et al. |

OTHER PUBLICATIONS

International Search Report and Written Opinion for International Application No. PCT/US2015/044812 dated Nov. 2, 2015, 26 pages, by the International Searching Authority, Alexandria, VA US.

*Primary Examiner* — Hal Kaplan
(74) *Attorney, Agent, or Firm* — Rutan & Tucker, LLP

(57) ABSTRACT

A ring bus Shared Resource electrical System (SRS) has at least an essential electrical power ring bus and a critical electrical power ring bus as well as multiple SRS electrical power distribution platforms. Each SRS distribution platform includes one or more interconnected essential switchboards and two or more interconnected critical switchboards. Each essential switchboard is coupled through the essential electrical power ring bus to essential switchboards of two other SRS distribution platforms, and each critical switchboard is coupled through the critical electrical power ring bus to critical switchboards of two other SRS distribution platforms. Each SRS distribution platform directs power to one nominal load group and as well is configured to distribute power to a load group nominally supplied by another SRS distribution platform. One or more controller in each SRS distribution platform synchronizes the output voltage of SRS distribution platforms.

21 Claims, 11 Drawing Sheets

SHARED RESOURCE SYSTEM

RELATED APPLICATIONS

This application claims the benefit of U.S. Provisional Patent Application No. 62/036,875, filed Aug. 13, 2014, and entitled "SHARED RESOURCE SYSTEM" and U.S. Provisional Patent Application No. 62/076,346, filed Nov. 6, 2014, and entitled "SHARED RESOURCE DISTRIBUTED DISTRIBUTION SYSTEM (SRDDS)", and are herein incorporated in by reference.

FIELD

Some embodiments of the design generally relate to Electrical Power Distribution and more particularly to a modular platform.

BACKGROUND

Construction projects can take a large number of electrical components, each with a large current carrying capacity, in order to distribute AC electrical power in a Mission Critical Facility. However, some electrical components may not be needed at the beginning and can be added later.

SUMMARY

A ring bus Shared Resource electrical System (SRS) is described. The ring bus SRS has two or more electrical power distribution ring buses including an essential electrical power ring bus and a critical electrical power ring bus, and multiple SRS electrical power distribution platforms. Each SRS electrical power distribution platform has one or more essential switchboard cabinets that have at least a first group of one or more circuit breakers and one or more bus bars to direct electricity to essential electrical loads, and two or more critical switchboard cabinets that have at least a second group of one or more circuit breakers and one or more bus bars to direct electricity to critical electrical loads. A first electrical connection and a second electrical connection, via the essential electrical power ring bus, separately interconnect one or more essential switchboard cabinets located in a first SRS electrical power distribution platform to one or more essential switchboard cabinets located in at least two other SRS electrical power distribution platforms. Also a third electrical connection and a fourth electrical connection, via the critical electrical power ring bus, separately interconnect one or more critical switchboard cabinets located in the first SRS electrical power distribution platform to one or more critical switchboard cabinets located in at least two other SRS electrical power distribution platforms. The essential electrical power ring bus is broken into two or more segments consisting of alternating sources of power supplied into the essential electrical power ring bus and power out of the essential electrical power ring bus. A first segment of the essential electrical power ring bus has power supplied through the first electrical connection from the essential switchboard cabinets from the first SRS electrical power distribution platform as well as power potentially supplied from a fifth electrical connection from the essential switchboard cabinets located in a second SRS electrical power distribution platform, and then power out of that first segment of the essential electrical power ring bus from a sixth electrical connection from the essential switchboard cabinets to respective essential electrical loads. The critical switchboard cabinets located in the first SRS electrical power distribution platform are electrically configured to distribute electrical power to critical electrical loads nominally supplied by that first SRS electrical power distribution platform as well as are configured in power capacity and are electrically connected via the critical electrical power ring bus to be able to distribute electrical power to critical electrical loads nominally supplied by the second SRS electrical power distribution platform. Also, the critical electric power ring bus is broken into two or more segments. A first segment of the critical electrical power ring bus is formed by the interconnections between the critical switchboard cabinets located in the first SRS electrical power distribution platform and the critical switchboard cabinets located in the second SRS electrical power distribution platform. Each of the segments of the critical electrical power ring bus is formed by the interconnections between the critical switchboards cabinets located in the multiple SRS electrical power distribution platforms in a ring loop distribution configuration. The critical ring electrical power bus is broken into segments consisting of alternating sources of power into the critical electrical power ring bus through the electrical connections to the critical switchboard cabinets and then power out from electrical connections from the critical switchboard cabinets to respective critical electrical loads. The ring bus SRS also includes one or more static uninterruptable power supply (UPS) units that are coupled to the critical switchboard cabinets of each SRS electrical power distribution platform and are configured to supply conditioned continuous AC power to the critical electrical loads. A seventh electrical connections couples the UPS units to the critical switchboard cabinets of the first SRS electrical power distribution platform. The ring bus SRS further includes one or more control circuitry units located in each SRS electrical power distribution platform with control circuitry connections between the multiple SRS electrical power distribution platforms and configured to synchronize electrical power of the SRS electrical power distribution platforms to at least the critical electrical loads.

A method of operating a ring bus Shared Resource electrical System (SRS) is described. The method includes coupling multiple SRS electrical power distribution platforms through two or more electrical power distribution ring buses. The electrical power distribution ring buses include an essential electrical power ring bus and a critical electrical power ring bus and each SRS electrical power distribution platform has one or more essential switchboard cabinets and two or more critical switchboard cabinets. The method also includes directing electrical power to essential electrical loads from essential switchboard cabinets and directing electrical power to critical electrical loads from critical switchboard cabinets; as well as coupling the essential switchboard cabinets of each SRS electrical power distribution platform to essential switchboard cabinets of two other SRS electrical power distribution platforms via the essential electrical power ring bus, and coupling the critical switchboard cabinets of each SRS electrical power distribution platform to critical switchboard cabinets of two other SRS electrical power distribution platforms via the critical electrical power ring bus. The method further includes breaking the essential electrical power ring bus into segments with alternating source of power into each segment of the essential electrical power ring bus and power out of that segment of the essential electrical power ring bus to the essential electrical loads, and breaking the critical electrical power ring bus into segments with alternating source of power into each segment of the critical electrical power ring bus and power out of that segment of the critical electrical power ring bus to the critical electrical loads. The method configures each SRS electrical power distribution platform to distribute electrical power to critical electrical loads nominally supplied by that SRS electrical power distribution platform and to potentially supply electrical power to critical electrical loads nominally supplied by another SRS electrical power distribution platform. The method also couples one or more static uninterruptable power supplies (UPS) units to each SRS electrical power distribution platform to provide conditioned continuous AC power for the critical electrical loads, and synchronizes electrical power of the SRS electrical power distribution platforms.

BRIEF DESCRIPTION OF THE DRAWINGS

The eleven drawings refer to embodiments of the design in which.

Figure 1:
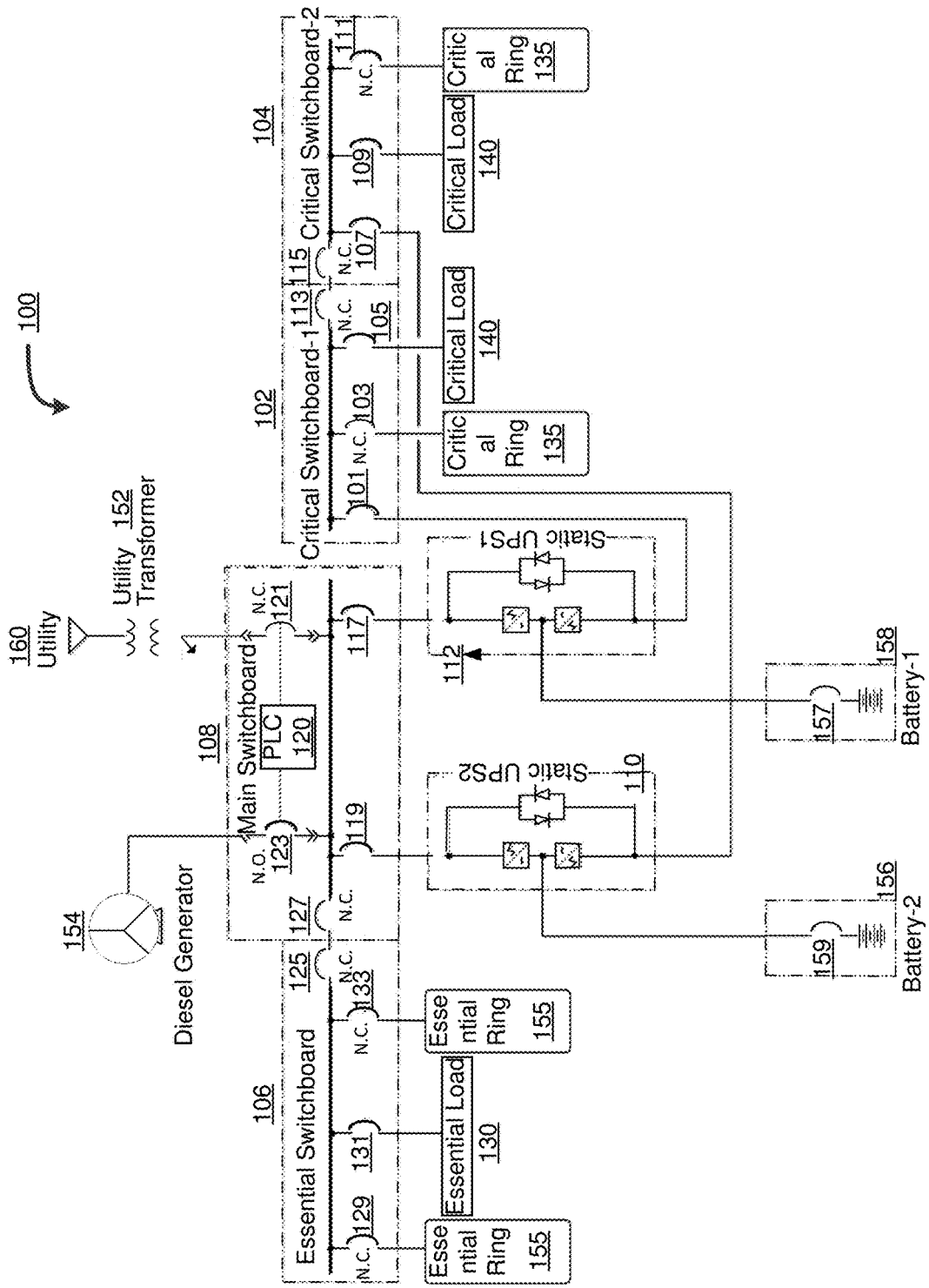
FIG. 1 is a single line diagram of a single SRS power distribution platform. Multiple SRS power distribution platforms can interconnect via ring buses.

In the accompanying drawings, dashed lines are used to represent communication and/or control connections. While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the scope of the design.

DETAILED DISCUSSION

In the following description, numerous specific details are set forth, such as examples of specific data signals, named components, connections, amount of distribution buses, etc., in order to provide a thorough understanding of the present design. It will be apparent, however, to one of ordinary skill in the art that the present design may be practiced without these specific details. In other instances, well known components or methods have not been described in detail but rather in a block diagram in order to avoid unnecessarily obscuring the present design. Further specific numeric references such as first switchboard cabinet, may be made. However, the specific numeric reference should not be interpreted as a literal sequential order but rather interpreted that the first switchboard cabinet is different than a second switchboard cabinet. Thus, the specific details set forth are merely exemplary. The specific details may be varied from and still be contemplated to be within the scope of the present design. The term coupled is defined as meaning connected either directly to the component or indirectly to the component through another component. Additionally, features in one embodiment may be implemented in another embodiment, where logically possible. Therefore, it is intended that the present invention described herein covers all modifications and variations of this invention falling within the scope of the claimed characteristics and features and their equivalents. Many example embodiments will be discussed below.

In general, disclosed herein are various methods and apparatuses associated with a ring bus Shared Resource electrical System (SRS) to distribute power to critical as well as essential loads. The ring bus SRS is at least a dual ring bus electrical power distribution system in which power from each ring bus is shared by multiple electrical power users and power supplied to each ring bus is provided by multiple switchboard cabinets. Each switchboard electrically connects to multiple other switchboards to potentially receive power from the other switchboards in different SRS power distribution platforms, where isolation circuit breakers couples the switchboards to the ring buses and allows any component of each SRS electrical power distribution platform to be completely shut down and de-energized without shutting down any of the loads. Isolation circuit breakers are also used to couple the critical switchboards of the same SRS power distribution platform together. The essential electrical power ring bus directs power to the essential loads and the critical electrical power ring bus directs power to the critical loads.

Examples of Conveyed Meanings of Terms

The following terms used consistently throughout this specification are meant to convey examples of meanings given below:

1. Static UPS: UPS shall denote a battery backed up uninterruptable power system. The term static is used to differentiate this type of UPS from those which deploy a rotating mass.

2. "Critical Loads" or "No-Break Loads": refers to electrical equipment that requires continuous conditioned electrical power. Typically critical equipment requires manual intervention to re-start after a power outage.

3. "Essential Loads" or "Short-Break Loads": refers to equipment that can sustain a momentary power outage. Typically essential equipment does not require manual intervention to re-start after a power outage.

4. "By-Pass": shall denote an alternative power path. The bypass path can be either automatically or manually switched in to replace a primary power path. The bypass power paths can be used when the primary power path fails or need to be shut down for service or maintenance.

5. Diesel Generator: is the combination of a diesel engine with an electric generator (often an alternator) to generate electrical energy. This is a specific case of engine-generator. The Diesel Generator, and/or another similar power source, can and may be an alternate source of AC power for the shared resource system from the one or more connections to the Utility Power grid. While this application notes the alternate source of power to the Utility input is a diesel engine-generator, the shared resource system may have an alternate power input from another AC power source such as a Utility, campus power system, fuel cell, or other AC power source. A diesel engine does not of course necessarily run on diesel oil as its fuel—the word diesel engine means compression-ignition, and tells us nothing about the fuel—it may run on gas.

6. Synchronization: is the process of matching the speed and frequency of a generator or other sources of power to a running network. An AC generator cannot deliver power to an electrical grid unless it is generating power at the same frequency as the network. If two segments of a grid are disconnected, they cannot exchange AC power again until they are brought back into exact synchronization.

7. CAN_BUS: is an ISO 11898 standard designed to allow microcontrollers and devices to communicate with each other within a vehicle without a host computer.

8. Static Switch: Switching of circuits by means of magnetic amplifiers, semiconductors, and other devices that have no moving parts.

9. Line reactor: are used to reduce short-circuit currents which result from line faults, plant expansions or power source additions, to levels that can be adequately handled by existing distribution equipment.

FIG. 1 is a single line diagram of a single SRS power distribution platform. Multiple SRS power distribution platforms would interconnect via ring buses. The figure includes the utility service source 160, utility service transformer 152, diesel engine generator 154, main switchboard 108, essential switchboard 106, critical switchboard-1 102, critical switchboard-2 104, static UPS-1 112, static UPS-2 110, essential switchboard ring bus connections 155, critical switchboard ring bus connections 135, essential load connections 130, critical load connections 140, UPS1 batteries 158, circuit breaker 157, UPS2 batteries 156, circuit breaker 159, PLC controller 120, electrically operated utility circuit breaker 121, electrically operated generator circuit breaker 123. Transfers between utility and diesel generator power are intended to be open (break before make) transfers. There are multiple, such as four, power distribution platform 100 in a typical SRS distribution system. (See FIG. 3 for an example single line diagram of the SRS with four power distribution platforms).

The individual SRS power distribution modules (e.g., platforms) 100 are comprised of the following components:

1. Main Switchboard 108.
2. Two static UPS modules 110 and 112.
3. One essential power distribution switchboard 106.
4. Two critical power distribution switchboards 102 and 104.
5. PLC controls 120.

Each SRS electrical power distribution platform includes at least one main switchboard cabinets 108, at least two static UPS units 110 and 112, at least two critical switchboard cabinets 102 and 104, at least one essential switchboard cabinets 106, and a Programmable Logic Controller (PLC) 120 to fully synchronize the electrical phase and frequency between SRS electrical power distribution platforms and load share electrical power loads among the SRS electrical power distribution platforms 100. Each main switchboard cabinet 108 can be coupled to both a dedicated diesel generator 154 and to AC utility grid 160. The main switchboard cabinet 108 is also equipped with two transfer pair circuit breakers 121 and 123, which can be configured to transfer between the AC utility grid and the diesel generator and two isolation circuit breakers 117 and 119 for connecting the AC electrical power to the UPS units 112 and 110. Each essential switchboard cabinet 106 can have two circuit breakers 129 and 133 for connection to the essential electrical power ring bus and each critical switchboard cabinet 102 or 104 has one circuit breaker 103 or 111 for connection to the critical electrical power ring bus. Also, the mentioned circuit breakers can be isolation circuit breakers. The two transfer pair circuit breakers 121 and 123 switch together (break before make), for example, when circuit breaker 121 opens then circuit breaker 123 closes, and when circuit breaker 123 opens then circuit breaker 121 closes.

Critical switchboard cabinet 102 or 104 of the first SRS electrical power distribution platform 100 is coupled to one or more static UPS units 110 and 112 of the first SRS electrical power distribution platform and is configured to receive conditioned continuous AC power for the critical electrical loads. Each static UPS unit 110 or 112 can be coupled to the main switchboard cabinet 108 of the first SRS electrical power distribution platform 100 to receive either AC electrical power from a diesel generator 154 or AC electrical power from AC utility grid 160. Each critical switchboard cabinet 102 or 104 of the first SRS electrical power distribution platform can also be coupled to at least one critical switchboard cabinets of other SRS electrical power distribution platforms to receive conditioned continuous AC power from another SRS electrical power distribution platforms for the critical electrical loads.

Thus, the main switchboard cabinet in each SRS electrical power distribution platform has a first electrical connection to a diesel engine generator 154 dedicated to powering the SRS electrical power distribution platform, and a second electrical connection to a utility AC grid 160 for powering the SRS electrical power distribution platform through a dedicated utility service transformer 152, where the first and the second electric connections are equipped with two PLC controllable transfer pair circuit breakers 121 and 123 which transfer between utility and generator power. The main switchboard cabinet 108 has one or more electrical connections via isolation circuit breakers to one or more uninterruptable power supplies 110 and 112 as well as one or more electrical connections via isolation circuit breakers to essential switchboard cabinets 106.

In an example, a first main switchboard cabinet in the first SRS electrical power distribution platform can have a first power connection to a first dedicated diesel engine generator to receive electric AC power for the first SRS electrical power distribution platform. The first main switchboard cabinet can also have second power connection through a first dedicated utility service transformer to a utility AC grid to receive electric AC power for the first SRS electrical power distribution platform. The first power connection and the second power connection are equipped with a first set of two PLC controllable transfer pair circuit breakers that are configured to switch between utility and generator power. The first main switchboard cabinet also includes a first PLC controller with control circuitry to synchronize an output power of the UPS units of the first SRS electrical power distribution platform with output powers of the UPS units of other SRS electrical power distribution platforms. The first main switchboard cabinet further includes one or more electrical connections via isolation circuit breakers to the UPS units of the first SRS electrical power distribution platform to provide AC electric power to the UPS units. The UPS units are coupled through circuit breaker to the critical switchboard cabinets of the first SRS electrical power distribution platform, and the critical switchboard cabinets of the first SRS electrical power distribution platform are coupled through circuit breaker to the critical electrical loads and provide conditioned continuous AC power of the UPS units of the first SRS electrical power distribution platform to the critical electrical loads. One or more electrical connections via isolation circuit breakers to the essential switchboard cabinets of the first SRS electrical power distribution platform provide AC electric power to the essential switchboard cabinets of the first SRS electrical power distribution platform. The essential switchboard cabinets of the first SRS electrical power distribution platform are coupled through circuit breakers to the essential electrical loads and provide AC electric power to the essential electrical loads.

Also, in an example, a second main switchboard cabinet in the second SRS electrical power distribution platform can have a third power connection to a second dedicated diesel engine generator to receive electric AC power for the second SRS electrical power distribution platform. The second main switchboard can also have a fourth power connection through a second dedicated utility service transformer to the utility AC grid to receive electric AC power for the second SRS electrical power distribution platform. The third power connection and the fourth power connection are equipped with a second set of two PLC controllable transfer pair circuit breakers that are configured to switch between utility and generator power. The second main switchboard can also have a second PLC controller with control circuitry to synchronize an output power of the UPS units of the second SRS electrical power distribution platform with the output powers of the UPS units of the other SRS electrical power distribution platforms. One or more electrical connections via isolation circuit breakers to the UPS units of the second SRS electrical power distribution platform provide AC electric power to the UPS units. The UPS units are coupled through circuit breaker to the critical switchboard cabinets of the second SRS electrical power distribution platform. The critical switchboard cabinets of the second SRS electrical power distribution platform are coupled through circuit breaker to the critical electrical loads and provide conditioned continuous AC power of the UPS units of the second SRS electrical power distribution platform to the critical electrical loads. A system control cabinet may couple to either the critical switchboard cabinets or essential switchboard cabinets. One or more electrical connections via isolation circuit breakers to the essential switchboard cabinets of the second SRS electrical power distribution platform provide AC electric power to the essential switchboard cabinets of the second SRS electrical power distribution platform. The essential switchboard cabinets of the second SRS electrical power distribution platform are coupled through circuit breakers to the essential electrical loads and provide AC power to the essential electrical loads.

The critical loads require conditioned continuous AC electrical power and essential loads are configured to tolerate momentary power outage. The critical loads are coupled to the critical switchboards 102 and 104 through the critical electrical power ring bus and the essential loads are coupled to the essential switchboards 106 through the essential electrical power ring bus.

The individual static UPS modules must be able to support a total of eight UPS modules connected in a parallel redundant configuration. In a parallel redundant UPS system all of the individual UPS modules must operate as a single UPS system. They must be able to fully synchronize and load share. There is no system cabinet in a parallel redundant system. Each UPS module must have an internal static bypass switch.

As discussed, one or more static uninterruptable power supply (UPS) units 110 or 112 can be coupled to each SRS electrical power distribution platform 100. The UPS units can be configured to supply conditioned continuous power to the critical loads, which are the loads that cannot sustain power loss.

Each SRS power module will be supplied by a dedicated utility transformer and a dedicated diesel generator. Utility power will be the primary source of power. The diesel generator will provide standby power.

The SRS dual ring bus design requires power to all four utility transformers originate from a single utility AC source. This is to insure the outputs of the utility transformers are fully synchronized. Synchronization is mandatory.

Therefore, the SRS electrical power distribution platforms of a ring bus SRS are all coupled to a single utility AC source to receive synchronous input.

The SRS dual ring bus design requires power from all four standby generators be fully synchronized. The SRS generators are N+1 redundant. If any single generators fail to start the remaining three generators have sufficient power to support the total critical equipment and essential equipment loads. If multiple generators fail on start up or during operations the system will then move to island mode. The loop tie circuit breakers will open and the remaining SRS power centers with switch to island mode operations. In 'island mode' operations each individual SRS power center will only support the critical and essentials load directly connect to that specific power center. The SRS power centers without standby power will not be supported.

Faults on any component in an SRS ring bus to allow the remaining components to continue to operate. Any component of the SRS can be de-energized and isolated for maintenance.

The subject design relates to electrical power distribution within a Mission Critical Facility such as a datacenter. The SRS distribution system uses dual conversion or static Uninterruptible Power Supplies (UPSs) to support the critical distribution ring. Diesel generators provide long term backup AC power for both the critical power and essential power distribution rings.

A Mission Critical Facility is defined as a facility with continuous operation requirements. Critical equipment is defined as equipment that requires a continuous or 'no-break' source power while in operation. Static UPSs are incorporated into the SRS ring bus design to provide continuous conditioned power to critical equipment to ensure continuous power is provided while in operation. Static UPSs use batteries to provide continuous power during a power outage rather than a rotating UPS such as flywheel or generator. They typically have between 1 to 15 minutes of battery backed up power. Critical equipment typically requires manual intervention to restart after a power outage. The Static UPSs do not need to have a choke directly connected to the output of each static UPS because by design the maximum fault current out of a static UPS will be 150% of its rating current output. The fault protection scheme of isolation breakers and differential current protection will adequately protect the electrical components in the distribution system for these types of overloads. However, the fault currents, such as 10,000 amps of fault current, from other AC power sources can be quite high and need choke/Line reactor interconnecting in between the AC power source and loads for fault current control. The choke/Line reactor or similar component in the system limits the maximum amperage of the instantaneous electrical current to prevent over current problems such as excessive heat, arcing, and potential fire and/or destruction of the electrical components in the shared resource system.

Thus, each SRS electrical power distribution platform includes at least a pair of loop tie circuit breakers connected to the essential electrical power ring bus and the critical electrical power ring bus, the pair of loop tie circuit breakers are configured to electrically open and put nominally connected SRS electrical power distribution platforms to switch to an island mode operation in the event of multiple generators failure at startup or during operations, where in the island mode operation a controller of each SRS electrical power distribution platform is configured to cause support of only the critical and essential loads directly connected (e.g., assigned critical and essential loads) to that specific SRS electrical power distribution platform. The loop tie circuit breakers can be isolation circuit breakers. In an example, the loop tie circuit breaker can couple the critical switchboard cabinets of each SRS electrical power distribution platform together. In an example, switching to the island mode operation can only happen at startup.

As discussed, the first SRS electrical power distribution platform can have a first critical switchboard cabinet and a second critical switchboard cabinet in series with two normally closed isolation circuit breakers coupling the two critical switchboard cabinets. The use of two normally closed isolation circuit breakers completely isolates the critical electrical loads of the first critical switchboard cabinet of the first SRS electrical power distribution platform from the second critical switchboard cabinet of the first SRS electrical power distribution platform and allows the first critical switchboard cabinet and the second critical switchboard cabinet to independently shut down and de-energize.

Figure 2:
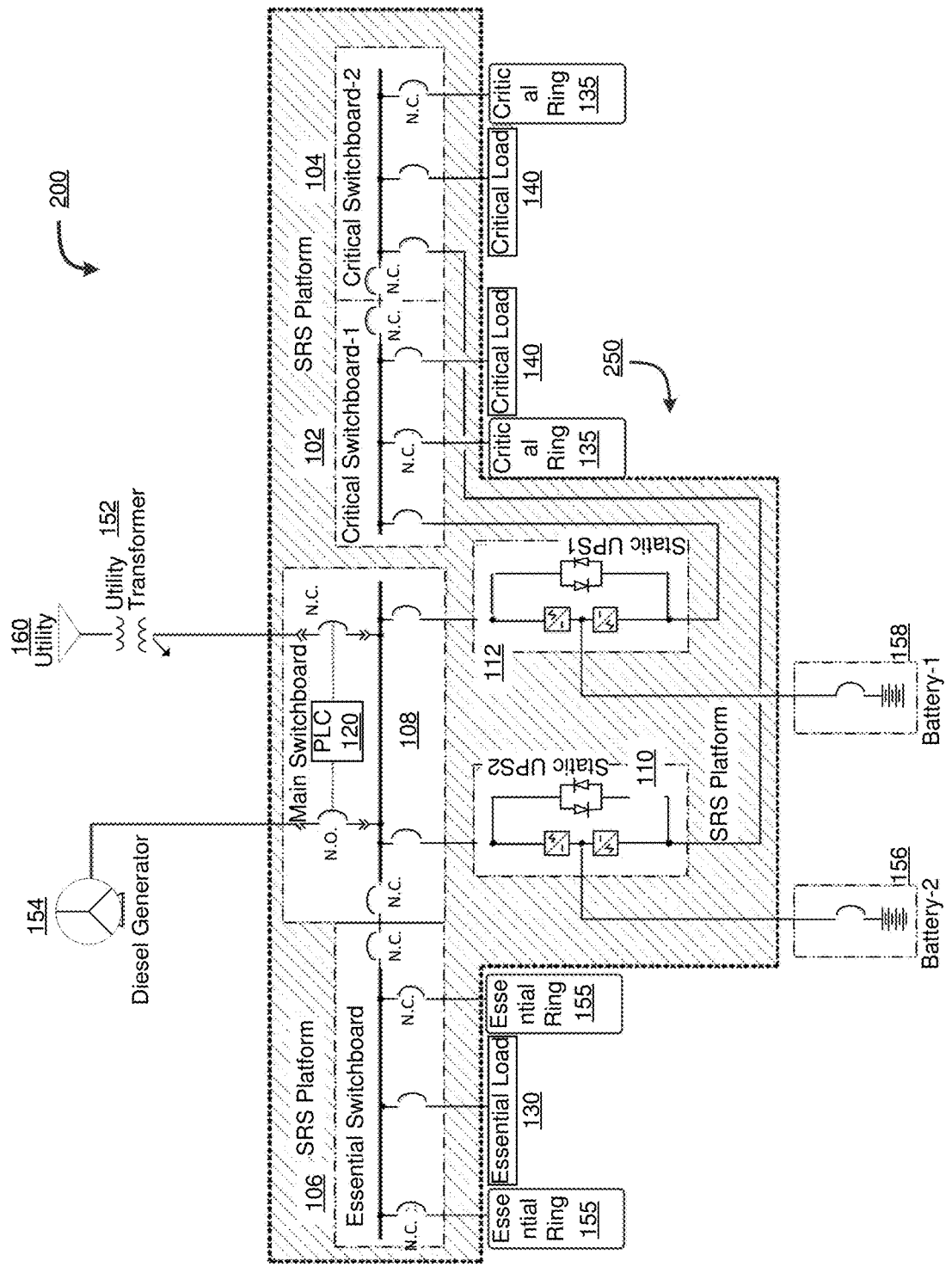
FIG. 2 is a single line diagram showing a single SRS power distribution platform with delineation of the equipment on the modular power center's platform and the equipment not on the modular power center's platform.

Additional isolation circuit breakers are placed between the two critical power distribution switchboards. An isolation circuit breaker is placed between and the essential and main switchboards. The isolation circuit breakers are required to be able to completely de-energize the individual switchboards while maintaining power to the energized SRS switchboards. The addition of isolation breakers on each tie to another switchboard as well as isolation breakers from the AC power sources as well as isolation breakers between critical switchboards, allows any component to be completely shut down and de-energized without shutting down any of the critical load because of the additional isolation breakers added. Note, the FIGS. 1, 2, 3 show one load for each essential or critical switchboard, but in practice, many loads will be powered from a switchboard and thus many circuit breakers may branch off the switchboard to loads but merely one is shown. Note, the load current for all of those loads will merely total or be less than the rating of the one circuit breaker shown.

The main switchboard cabinet 108 in each SRS electrical power distribution platform couples to two or more sources of AC electrical power and receives AC electrical power from the sources of AC electrical power and supplies AC electrical power through one or more circuit breakers 117 and 119 to the UPS units 112 and 110, and also supplies AC electrical power via two normally closed isolation circuit breakers 125 and 127 to the essential switchboard cabinets 106. The examples for the source of AC electrical power are an AC utility grid and a diesel generator.

Also, the main switchboard cabinet 108 has a first dedicated connection to a diesel generator 154 and a second dedicated connection to a utility AC grid 160, where the first connection is through an amp incoming current (AIC) line reactor 520 and the second connection is through either of 1) an AIC line reactor 510, or 2) a high impedance transformer 152 having an impedance greater than 5%, to limit a maximum amount of fault current that can be generated in the SRS electrical power distribution platform 100. The maximum amount of fault current is generated during the time period before an overload protective component can actuate.

Thus, the main switchboard cabinet 108 is configured to at least receive AC electrical power through a first dedicated connection coupled to a diesel generator and also through a second dedicated connection coupled to a utility AC grid. The first dedicated connection is through an amp incoming current (AIC) line reactor coupled between the main switchboard cabinet and the diesel generator. The second dedicated connection is through either of 1) an AIC line reactor coupled between the main switchboard cabinet and the utility AC grid, or 2) a high impedance transformer having an impedance greater than 5% that is coupled between the main switchboard cabinet and the utility AC grid. The use of AIC in the first dedicated connection as well as the use of AIC or high impedance transformer in the second dedicated connection limits the maximum amount of fault current that can be generated in the SRS electrical power distribution platform.

The SRS ring bus design has two electrical tie ins and circuit breakers into each switchboard from two other switchboards. Each switchboard can be supplied with AC power from two other sources in parallel if the main AC power source and UPS power supplies cannot power that switchboard.

The second set of the critical switchboard cabinets 102 and 104 of each SRS electrical power distribution platform 100 are coupled in series via two normally closed isolation circuit breakers 113 and 115 between each two critical switchboard cabinets. One or more normally closed isolation circuit breakers (e.g., 103 or 111) are used to connect, via the critical electrical power ring bus, the second set of the critical switchboard cabinets of a first SRS electrical power distribution platform to the second sets of the critical switchboard cabinets of a second and third SRS electrical power distribution platforms. The critical switchboard cabinets 102 and 104 of the first SRS electrical power distribution is configured to send power and to receive power from the critical switchboard cabinets of the second and third SRS electrical power distribution platforms.

Each one of the second set of the critical switchboard cabinets 102 and 104 of a SRS electrical power distribution platform 100 is electrically connected 1) through one or more circuit breaker 105 and/or 109 to one or more of the critical loads to provide power to critical loads, and 2) through one or more circuit breakers 101 or 107 to AC electrical power from a static UPS unit 110 or 112 to receive conditioned continuous power. The circuit breakers 105 and/or 109 are coupled to the critical loads through critical load connections 140.

The first set of the essential switchboard cabinets 106 of each SRS electrical power distribution platform 100 are coupled in series and also are coupled through one or more circuit breakers 131 to one or more essential loads. The circuit breaker 131 is coupled to the essential loads through essential load connections 130.

When the multiple SRS modular power centers are connected together the UPSs act as effectively connected to the same input source and the same output distribution bus. The UPSs communicate to ensure they are synchronized and properly aligned. Proper alignment ensures that all eight UPSs are either in the bypass mode or in inverter mode.

Essential equipment not backed up by UPS power can be subject to a 'short-break' power experience. Short-break refers to the time period the equipment is without power after an outage occurs. It specifically refers to the time it takes to start the generators then transfer load. Essential equipment typically does not require manual intervention and automatically restarts after a loss of power. Both SRS distribution ring buses employ an alternating interconnection scheme. The dual ring bus distribution is unique to the industry.

Equipment providing power are interlaced with equipment that requiring power.

Use of the ring bus SRS allows multiple electrical distribution platforms to connect to two or more sets of electrical loads in segments to bring power into that segment of the ring bus and take power out of that segment of the ring bus so as to reduce the capacity in size of the entire ring bus going throughout system as well as bring in fault redundant protection in case one or more of the electrical distribution platforms losses power but the other electrical distribution platforms connected to the ring bus ensure that all electrical loads continue to receive electrical power. In an example, critical and essential ring bus segments can be monitored for the amount of current flowing in that segment and when the amount of current exceeds a predefined limit an action can be taken to reduce the amount of current including diverting power from other platforms or load shut down.

Interlacing of sources of power supplies into a distribution switchboard and electrical loads supplied from that distribution switchboard allows the required ampacity of the ring bus to be significantly reduced. The system's alternates AC source power from i) other distribution buses and static UPSs to a switchboard and ii) electrical load connections from that switchboard to allow for significantly smaller ring bus ampacities. Each switchboard bus, whether a critical bus or an essential bus, has two breakers and tie ins to other ring buses and their respective power source powering that switchboard. This parallel electrical connection from multiple alternative AC power sources to each switchboard allows the maximum amperage of the components, bus bars and cabling to be lower in rating than if merely a single electrical connection powers a switchboard in a series connection.

Therefore, the essential and critical electrical power ring buses are broken into segments consisting of alternating sources of power supplied into the essential and critical ring buses and then power out from the essential and critical ring buses to electrical loads.

The SRS features multiple redundancies. The generators and distribution switchgear are N+1 redundant. The SRS UPSs are configured as N+2 redundant. This redundancy scheme allows any single component to fail or be taken 'off-line' while the remaining components continue to operate In accordance with one or more embodiments, a Shared Resource System provides redundancy and fault isolation. This configuration will be hereby referred to herein as an SRS (Shared Resource System) which has the following advantages.

1. The critical loads can be provided in increments based on the size of Power Distributions Units (PDUs). The PDU are provided in pairs. A 300 kW critical load would be supported by two 300 kVA PDUs.

2. A failure of any UPS or pair of UPSs will be supported by the remaining UPSs. The UPS redundancy is eight to make six or N+2 redundant.

3. A fault on any component is isolated allowing the remaining components of the SRS to continue to support the critical and essential equipment.

4. The critical load demand is equally shared by all of the UPSs. The UPS controls will determine the total critical load and then direct all of the individual UPS outputs to the same levels.

5. The critical load can be distributed on the SRS ring bus as required. It is not required that the loads be balanced. Individual loads cannot exceed the ratings of the equipment they are supported by.

6. The number of redundant systems in the SRS configuration is fixed. For example, the SRS can be comprised of four modular power centers as described above.

7. Any system may be taken out for maintenance without impacting the remaining critical loads.

8. Individual systems may be removed from the SRS for service or maintenance without an impact to the critical load.

9. The SRS can be used in 600V, 480V, or 415V applications.

In accordance with one or more embodiments, the dual ring bus, battery backed-up static UPS may be suitable for this application. In accordance with one or more embodiments, a potential restriction is that the utility inputs to the modular power centers must be fully synchronized.

Each static UPS unit 112 or 110 is backed up by one or batteries 158 or 156 to provide battery backed up power to critical loads. The battery backed up power is provided when the SRS electrical power distribution platforms switch from utility AC power to diesel generator AC power, thus supplying conditioned continuous AC electrical power without interruption.

Separate non-synchronized cannot be connected together in an SRS environment.

In accordance with one or more embodiments, a potential restriction is that the diesel generators incorporated within the SRS distribution must be fully synchronized. Non synchronized diesel generators cannot be incorporated into an SRS environment.

FIG. 2 is a single line diagram showing a single SRS power distribution module (e.g., platform) 200 with delineation of the equipment on the modular power center's platform and the equipment not on the modular power center's platform. The shaded portion 250 shows a modular power center platform. Equipment on the SRS modular platform includes: main switchboard 108, essential switchboard 106, critical switchboard-1 102, critical switchboard-2 104, static UPS-1 112, static UPS-2 110, PLC controller 120. Equipment not on the SRS platform: utility service transformer 152, diesel engine generator 154, essential switchboard ring bus connection 155, critical switchboard ring bus connection 135, essential load equipment connection 130, critical load equipment connection 140, UPS1 batteries 158, UPS2 batteries 156. The modular power center platform framework ranges in height from 7 to 36 inches from its bottom and typically the components are mounted onto a top surface of the platform.

The Programmable Logic Controller (PLC) 120 of the main switchboard cabinet 108 controls two transfer pair circuit breakers 121 and 123 located in the main switchboard cabinet 108 to switch to either receive AC electrical power through the first dedicated connection from the diesel generator 154, or receive AC electrical power through the second dedicated connection from the utility grid 160. The utility grid 160 is coupled to the main switchboard cabinet 108 through a utility transformer 152. At each point of time all SRS platforms are either coupled to the AC utility grid and receive AC electric power from the utility grid, or all are coupled to their respective diesel generators and receive AC electrical power from the diesel generators.

Figure 3A:
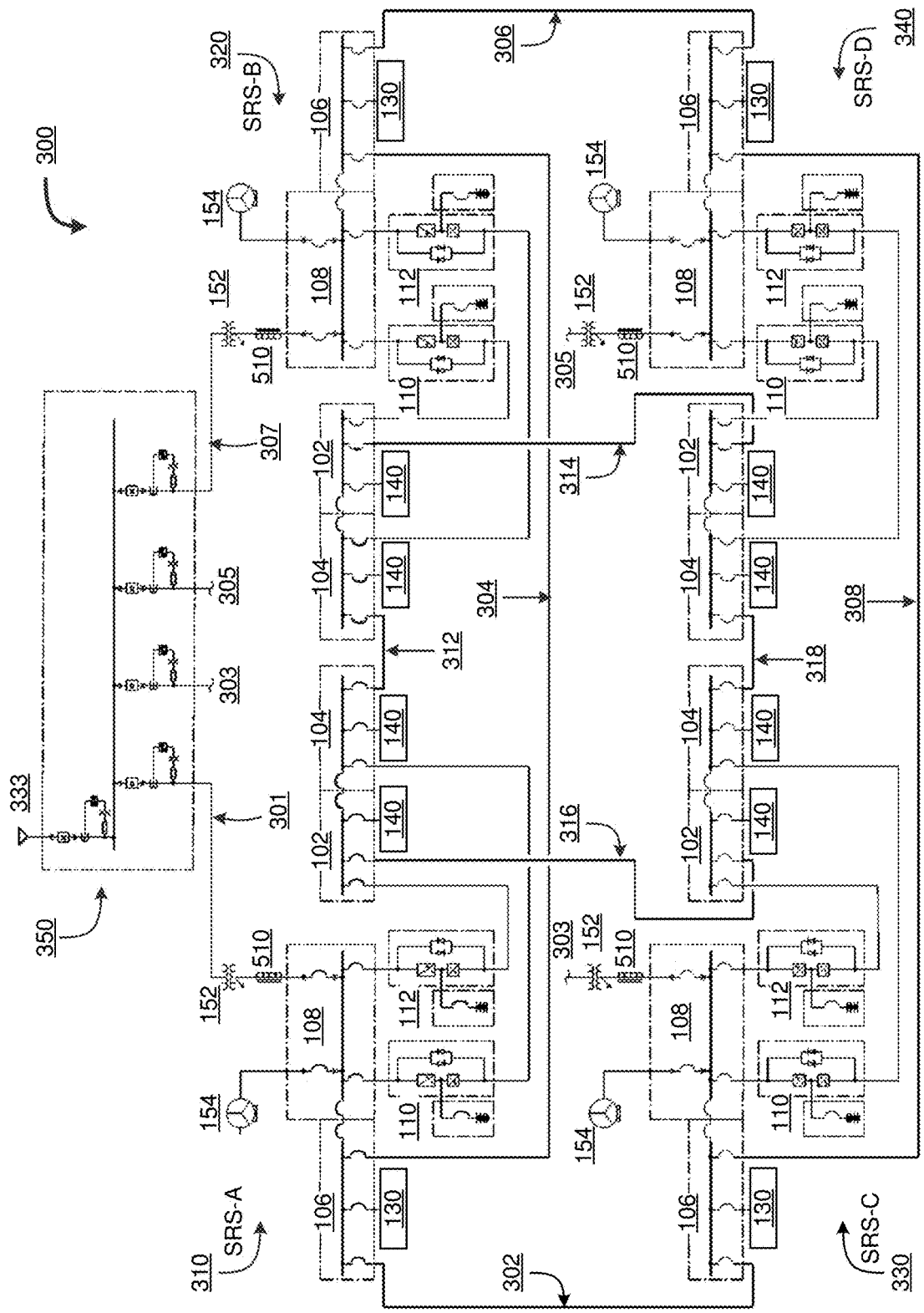
FIG. 3A is a single line diagram showing how four SRS power distribution platforms are interconnected by two ring buses.
Figure 7:
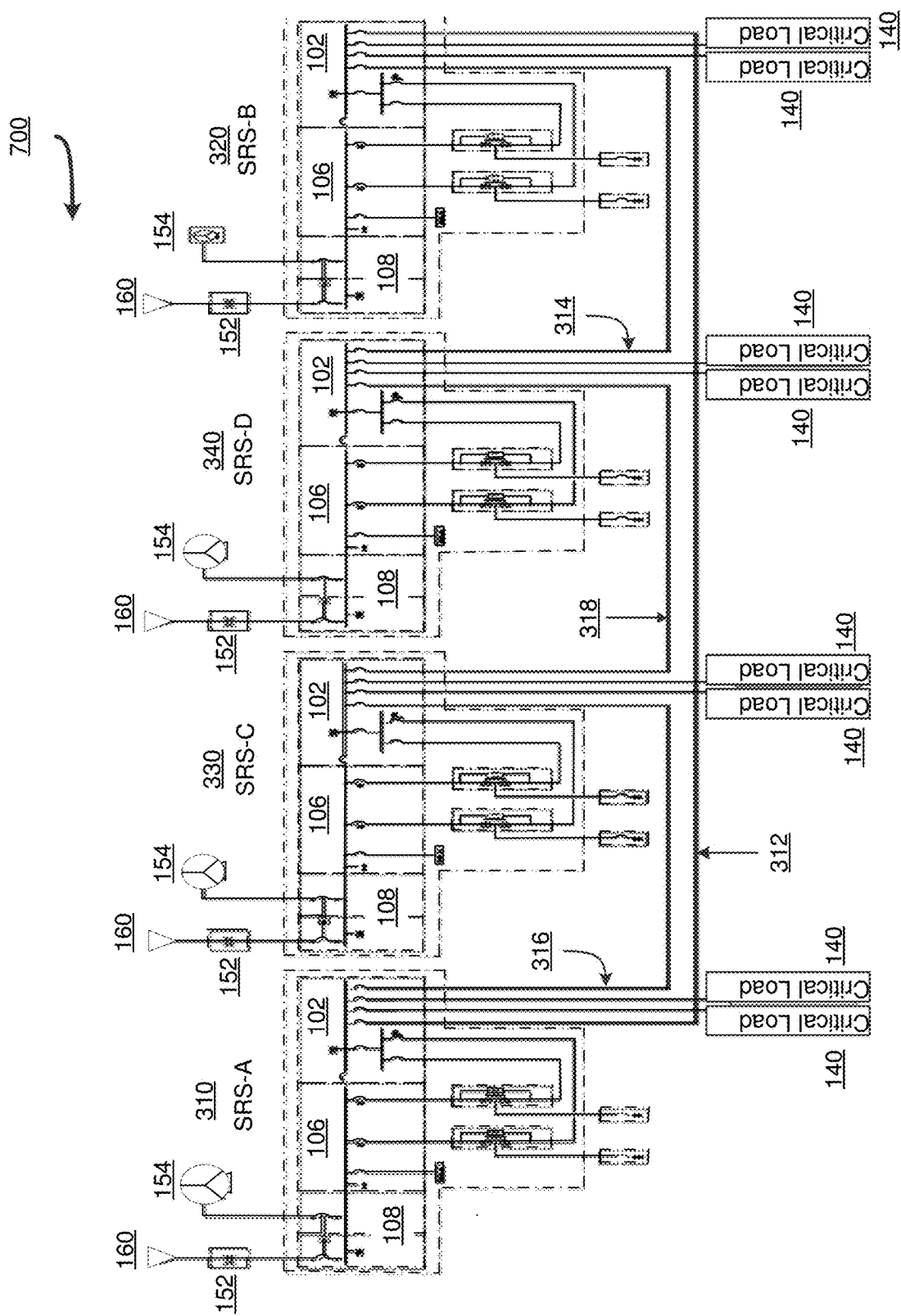
FIG. 7 is a single line diagram showing how four SRS power distribution platforms are interconnected where only one electrical power distribution ring bus is shown.

FIGS. 3A and 7 are single line diagrams showing how four SRS power distribution platforms are interconnected. FIG. 3A depicts two ring buses while FIG. 7 is shows only one of the ring buses. FIG. 7 shows the ring bus SRS 700 with only the critical electrical power ring bus. The SRS power distribution platforms in FIG. 7 have only one critical switchboard cabinet 102; whereas, the SRS power distribution platforms in FIG. 3A show two critical switchboard cabinets 102 and 104. FIG. 3A is a single line diagram on a complete ring bus SRS 300 implemented with four sets of components connected in a ring bus. An embodiment of a ring bus SRS deployment features four modular power platforms 100. Each power platform 100 shown in FIG. 1 has a single utility transformer 152, a diesel generator 154, and a single main switchboard 108. The main switchboard 108 is equipped with two transfer pair circuit breakers 121 and 123 that transfer between utility and generator power, two circuit breakers 117 and 119 for connection to the UPSs and one circuit breaker 131 for connection to essential load connection 130. Each SRS power platform 100 has two UPSs 110 and 112. The SRS design deploys four discrete SRS platforms that are connected together by its two ring buses (dual ring). The ring bus SRS 300 has four utility transformers and four diesel generators. The SRS design requires that single utility source feed the four different SRS utility transformers 152. The impedances of all SRS transformers should be matched as closely as possible to prevent circulating currents.

The SRS design deploys four generators 154. Like the UPSs the generators are effectively connected in a parallel configuration via the ring buses. Provisions must be made to ensure the generators operate as they would in paralleled system. This is that they are synchronized before they connect to the ring bus SRS 300. The electrical power distribution system can lose up to 2 main power (e.g., utility) transformers 152, 2 diesel generators 154, and two sets of UPSs and still supply 100% load capacity in the system 300. Each of the four critical switchboard sets (102 and 104) are interconnected as parts of a critical power ring bus. Each of the four essential switchboards 106 are interconnected as parts of an essential electrical power ring bus. The 'shared resource system' can significantly reduce the amount of equipment used in a data center's power distribution network.

A ring bus SRS 300 can have multiple SRS electrical power distribution platforms 100. Each SRS platform 100 can have a first set of one or more interconnected essential switchboard cabinets 106, as well as a second set of two or more interconnected critical switchboard cabinets 102 and 104. The critical switchboard cabinets 102 and 104 direct electrical power to critical loads and essential switchboard cabinets 106 direct electrical power to essential loads.

A complete ring bus SRS 300 can be comprised of four SRS power platforms 100. As shown on the single line diagram the SRS power centers are connected together by two ring buses. The essential equipment loads are connected together via the essential electrical power ring bus. The critical equipment loads are connected together by the critical electrical power ring bus. As shown in FIGS. 3A-3E, there are four ring bus connections for each SRS module 100, two essential load ring bus connections 155 and two critical load ring bus connections 135. In an example, there may be two or more essential load ring bus connections 155 coupled to the essential switchboard cabinets or likewise, two or more critical load ring bus connection 135 coupled to the critical switchboard cabinets. Thus, there may be two or more essential electrical loads connected to the essential switchboard cabinets and two or more critical loads connected to the critical switchboard cabinets of a SRS platform 100. It is important to keep the length of the ring bus feeders as short as possible. The length of the ring bus feeder should also be matched as closely as possible.

An embodiment of an SRS deployment 300 features multiple modular power platforms 100. Each platform has a single utility transformer 152 and generator 154 and a single main switchboard 108. The main switchboard 108 is equipped with two transfer pair circuit breakers 121 and 123, which transfer between utility and generator power and supply AC electrical power through two circuit breakers 117 and 119 for the UPSs and through one circuit breaker 127 for essential power ring bus connection. Each SRS power platform 100 has two UPSs 110 and 112. The UPSs are connected in a distributed parallel configuration. The Mission Critical Facility's back up power supply system deploys a large number of static UPSs in a distributed parallel arrangement. The large number of UPSs are structurally electrically connected via the dual ring bus and their control equipment is configured to synchronize the outputted voltage and frequency to allow them all to operate electrically in parallel. Distribution from the modular power center is from two critical power distribution switchboards and one essential power distribution switchboard.

Two or more electrical power distribution ring buses, for example an essential electrical power ring bus and a critical electrical power ring bus connect the SRS electrical power distribution platforms of a ring bus SRS.

Thus, the essential electrical power ring bus provides electrical connection between essential switchboard cabinets of different SRS electrical power distribution platforms to carry electrical power between essential switchboard cabinets 106 of different SRS electrical power distribution platforms. The essential equipment loads in the ring bus SRS 300 are connected together by the essential electrical power ring bus and have electrical connections configured to be powered by at least two different SRS power distribution platforms 100.

As an example, multiple SRS electrical power distribution platforms are a total of four SRS electrical power distribution platforms 100. The four SRS electrical power distribution platforms are connected together through the essential electrical power ring bus and the critical electrical power ring bus in a loop configuration. The four SRS electrical power distribution platforms each have at least one electrical connection through a circuit breaker to the essential electrical power ring bus, and at least one electrical connection via a circuit breaker to the critical electrical power ring bus.

The critical electrical power ring bus provides electrical connection between critical switchboard cabinets 102 and 104 of different SRS electrical power distribution platforms 100 to carry electrical power between critical switchboard cabinets of different SRS electrical power distribution platforms. The critical equipment loads in the ring bus SRS 300 are connected together by the critical electrical power ring bus and have electrical connections configured to be powered by at least two different SRS power distribution platforms.

A first and second electrical connections via the essential electrical power ring bus separately interconnect the essential switchboard cabinets 106 of each SRS electrical power distribution platform 100 to the essential switchboard cabinets 106 of two other SRS electrical power distribution platforms. Likewise, a third and a fourth electrical connections via the critical electrical power ring bus separately interconnect the critical switchboard cabinets 102 and 104 of each SRS electrical power distribution platform 100 to the critical switchboard cabinets 102 and 104 of the two other SRS electrical power distribution platforms.

The electrical loads are gathered into multiple load groups, each load group including one or more essential loads and critical loads. Each SRS electrical power distribution platform is configured to distribute electrical power to a specific load group designated for that SRS electrical power distribution platform. Each SRS electrical power distribution platform is also configured in electrical connection and power capacity to distribute electrical power to one or more other load groups where these loads are nominally designated to other SRS electrical power distribution platforms. The connection to the designated and other electrical loads can be via the essential and critical ring buses. As an example, power can be supplied to non-designated loads of a SRS electrical power distribution platform when a SRS platform designated for that load fails. The critical loads are connected through the critical electrical power ring bus to the critical switchboards cabinets and the essential loads are connected through the essential electrical power ring bus to the essential switchboards cabinets. An example load group may have one or more critical loads and/or one or more essential load.

Also, the ring buses can be divided into segments, the critical electrical loads can be divided into sets of critical electrical loads, and the essential electrical loads can as well be divided into sets of essential electrical loads. Likewise, each set of the critical electrical loads can be coupled to a shared critical electrical bus segment and can be powered by at least two different electrical power distribution platforms. Each set of the essential electrical loads can be coupled to a shared essential electrical bus segment and can be powered by at least two different electrical power distribution platforms.

As an example, the first SRS electrical power distribution platform is electrically configured to distribute electrical power to essential electrical loads nominally supplied by that first SRS electrical power distribution platform as well as is configured in power capacity and are electrically connected to be able to distribute electrical power to essential electrical loads nominally supplied by the second SRS electrical power distribution platform connected via the essential ring electrical power bus.

The first segment of the essential ring electrical power bus is formed between the interconnections between the essential switchboard cabinets located in the first SRS electrical power distribution platform and the essential switchboard cabinets located in the second SRS electrical power distribution platform.

The second segment of the essential ring electrical power bus is formed between the interconnections between the essential switchboard cabinets located in the first SRS electrical power distribution platform and the essential switchboard cabinets located in a third SRS electrical power distribution platform. Each of the segments of the essential electrical power ring bus is formed by the interconnections between the essential switchboards cabinets located in the multiple SRS electrical power distribution platforms in a ring loop distribution configuration.

Each segment of the essential electrical power ring bus has an alternating sequence of AC electrical power coming from the main switchboard cabinets into that segment of the essential electrical power ring bus and then essential electrical loads drawing AC electrical power out of that segment of the essential electrical power ring bus. The coming AC electrical power may be directed from the main switchboard cabinet of an SRS electrical power distribution platform to the essential switchboard cabinet of the SRS electrical power distribution platform. The AC electrical power drawn out of that segment may be directed out of the essential switchboard cabinet of the SRS electrical power distribution platform to the essential electrical loads.

Accordingly, the essential electrical power ring bus is broken into segments consisting of alternating sources of power into the essential electrical power ring bus through the electrical connections to the essential switchboard cabinets and then power out from electrical connections from the essential switchboard cabinets.

The second segment of the critical electrical power ring bus is formed between the interconnections between the critical switchboard cabinets located in the first SRS electrical power distribution platform and the critical switchboard cabinets located in the third SRS electrical power distribution platform. Each of the segments of the critical electrical power ring bus is formed by the interconnections between the critical switchboards cabinets located in the multiple SRS electrical power distribution platforms in a ring loop distribution configuration.

Each segment of the critical electrical power ring bus has an alternating sequence of conditioned continuous AC electrical power coming from the UPS units into that segment of the critical electrical power ring bus and then critical electrical loads drawing AC electrical power out of that segment of the critical electrical power ring bus. The coming AC electrical power may be directed from the UPS units of an SRS electrical power distribution platform to the critical switchboard cabinet of the SRS electrical power distribution platform. The AC electrical power drawn out of that segment may be directed out of the critical switchboard cabinet of the SRS electrical power distribution platform to the critical electrical loads.

Also, one or more static uninterruptable power supply (UPS) units can be coupled to each electrical power distribution platform and can be configured to supply conditioned continuous power to the critical electrical loads. Each set of the critical electrical loads can be coupled through a shared critical ring bus segment to the UPS units of two or more electrical distribution platforms and can be configured to receive continuous conditioned AC electrical power.

Accordingly, the critical electrical power ring bus is broken into segments consisting of alternating sources of power into the critical electrical power ring bus through the electrical connections to the critical switchboard cabinets and then power out from electrical connections from the critical switchboard cabinets.

The system delivers a significant amount of redundant electrical power with far fewer electrical components than traditional redundant electrical distribution systems. Redundancy refers system to the critical distribution components; Transformers, Generators, UPSs. Redundancy requires that the system continue to operate at 100% capacity in the event any one of these components were to fail. Reduce components by 50% of amongst Transformers, Generators, UPSs and still meet uptime tier 3 requirements. The system meets the Uptime Institute's concurrently maintainable requirements. Also, buying multiple smaller MW components such as four 3-MegaWatt line transformers is cheaper than buying a single larger component such as one 12 Megawatt line transformer. The implementation of this system significantly reduces the cost of the facility's electrical distribution equipment while still meeting tier 3 requirements.

Traditional systems have one tie into a switchboard and design has two tie ins and circuit breakers into a switchboard from two other switchboards. Each switchboard can be supplied with AC power from two other sources in parallel if the main AC power source and UPS power supplies cannot power that switchboard.

Next, the addition of isolation breakers on each tie to another switchboard, as well as isolation breakers from the AC power sources as well as isolation breakers between critical switchboards, allows any component to be completely shut down and de-energized without shutting down any of the critical load because of the additional isolation breakers added.

Additional isolation circuit breakers are placed between the two critical power distribution switchboards. An isolation circuit breaker is placed between the essential and main switchboards. The isolation circuit breakers are required to be able to completely de-energize the individual switchboards while maintaining power to the energized SRS switchboards. The addition of isolation breakers on each tie to another switchboard as well as isolation breakers from the AC power sources as well as isolation breakers between critical switchboards, allows any component to be completely shut down and de-energized without shutting down any of the critical load because of the additional isolation breakers added. Note, the figure shows one breaker for the loads but there can be more than one isolation circuit breaker.

Therefore, the sets of two isolation circuit breakers allow any component to be completely shut down and de-energized without shutting down any of the critical loads.

Figure 3B:
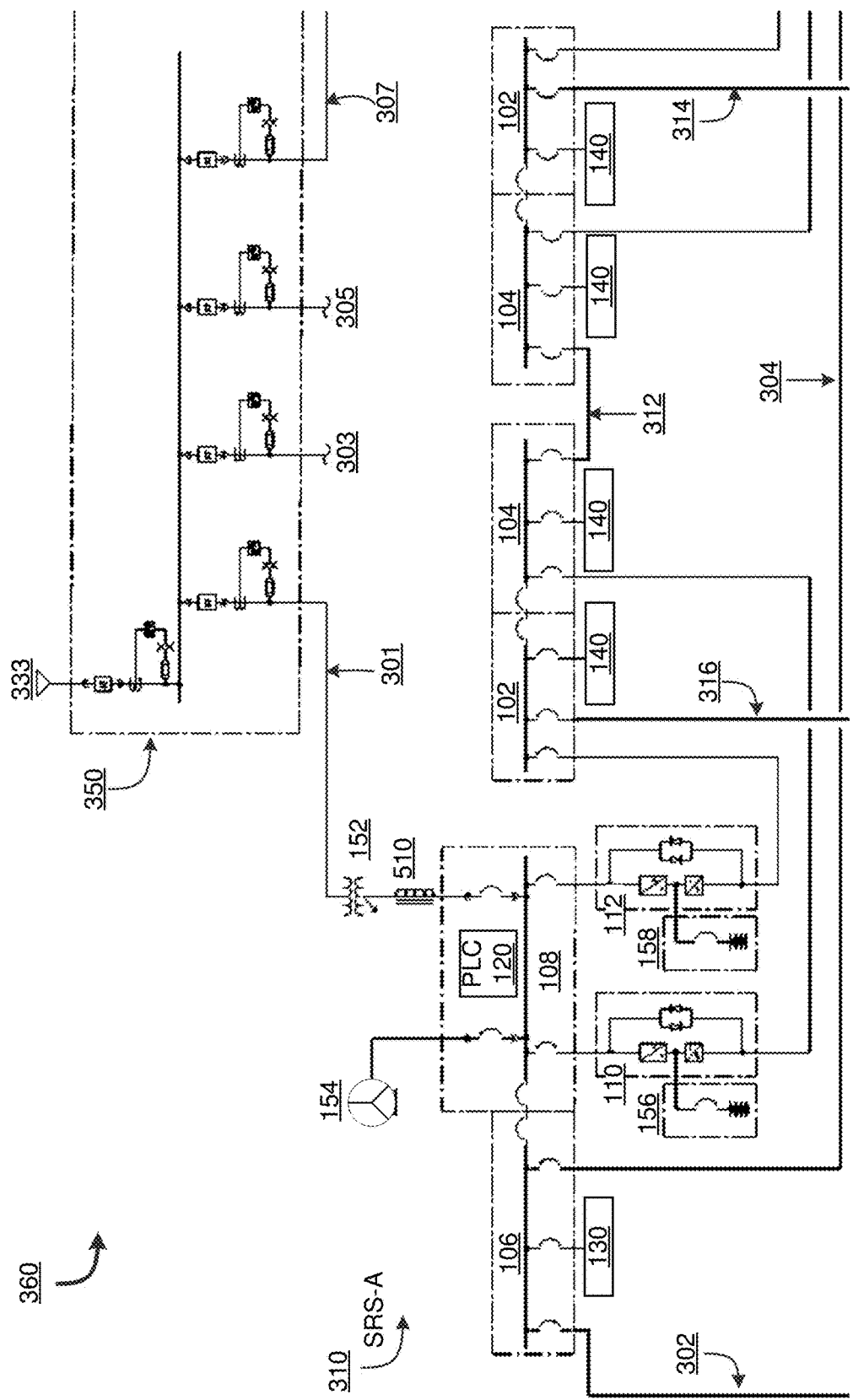
FIGS. 3B, 3C, 3D, and 3E each show a magnified view of a portion of the electrical schematic of FIG. 3A.
Figure 3C:
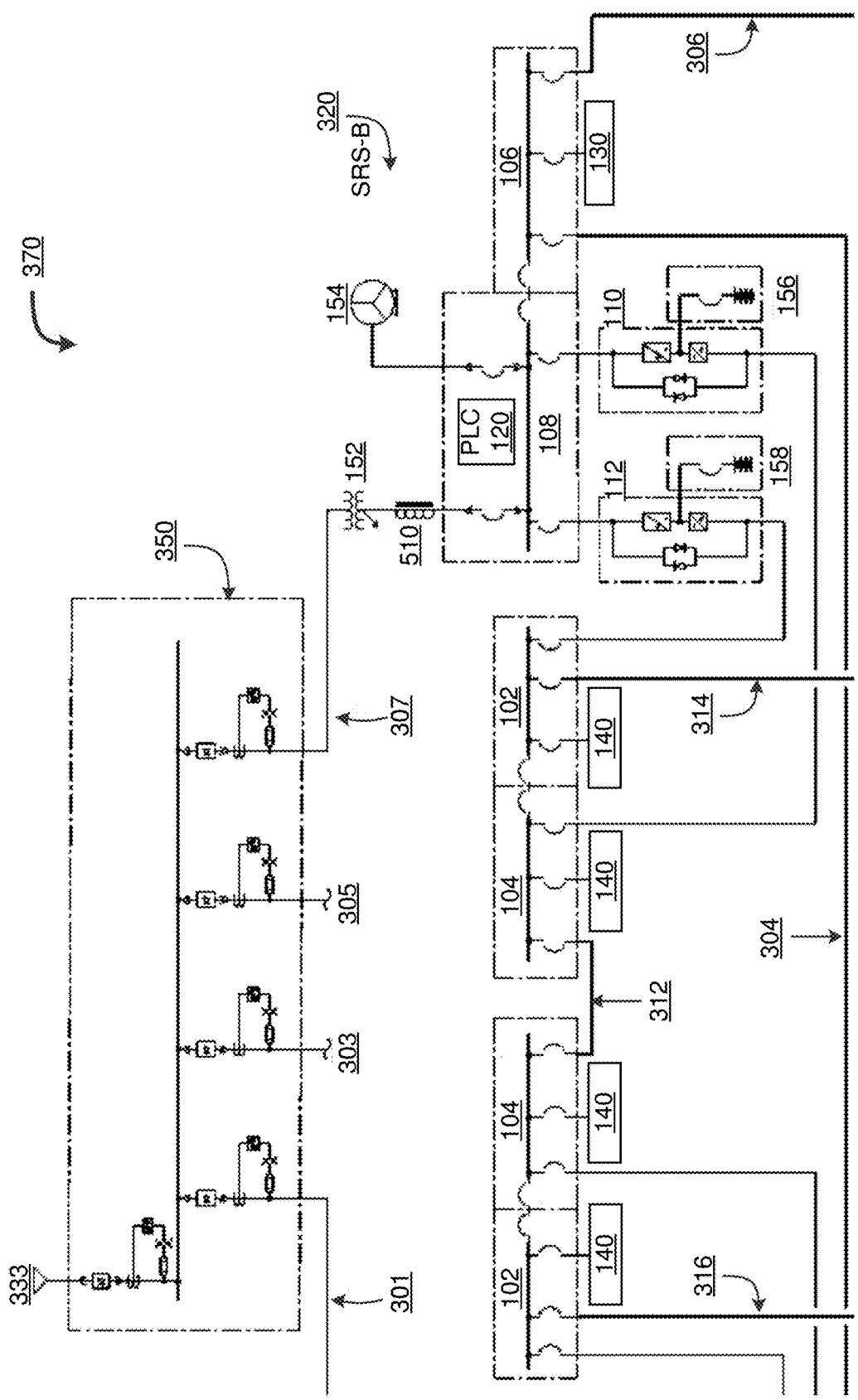
Figure 3D:
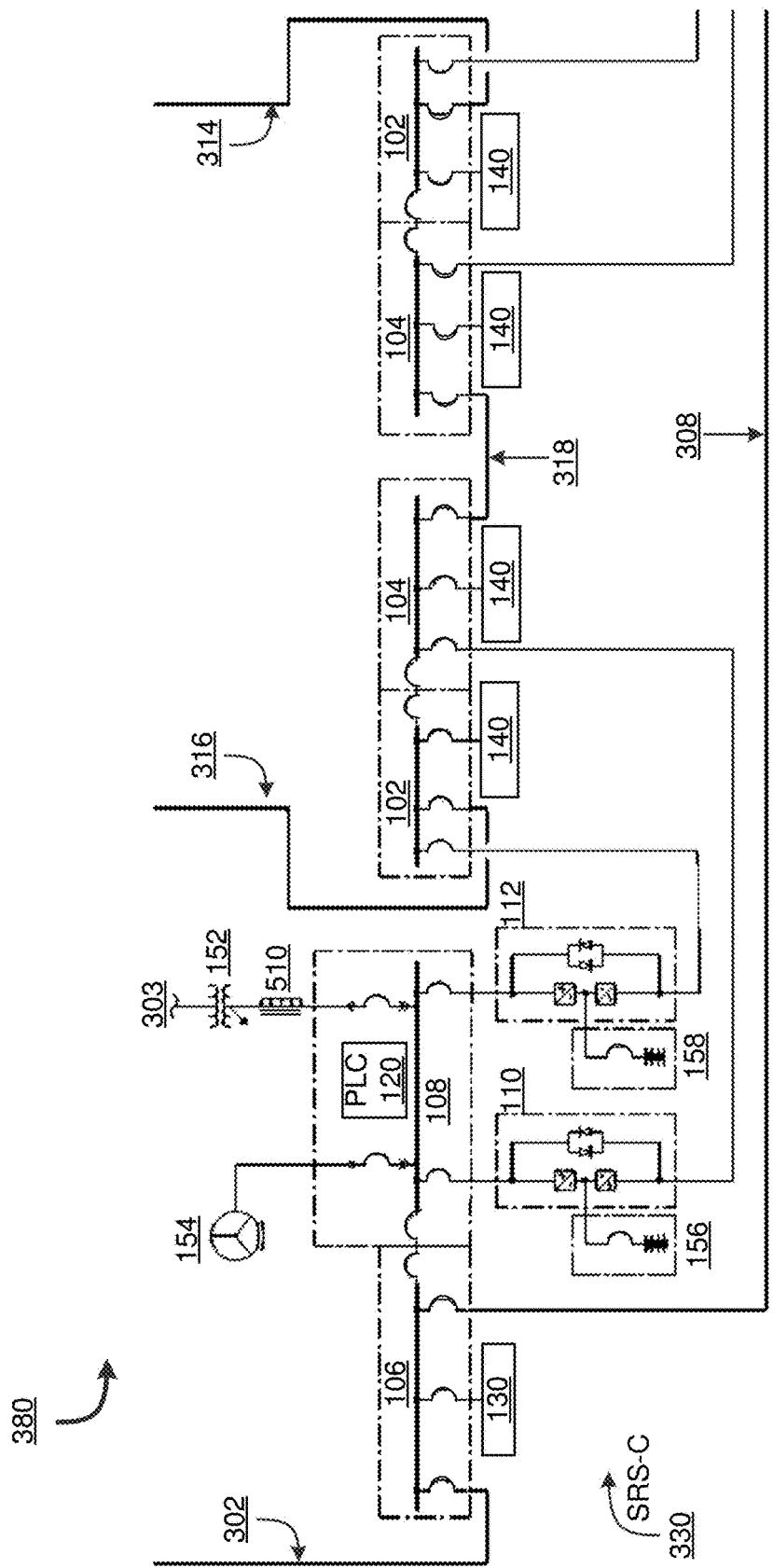
Figure 3E:
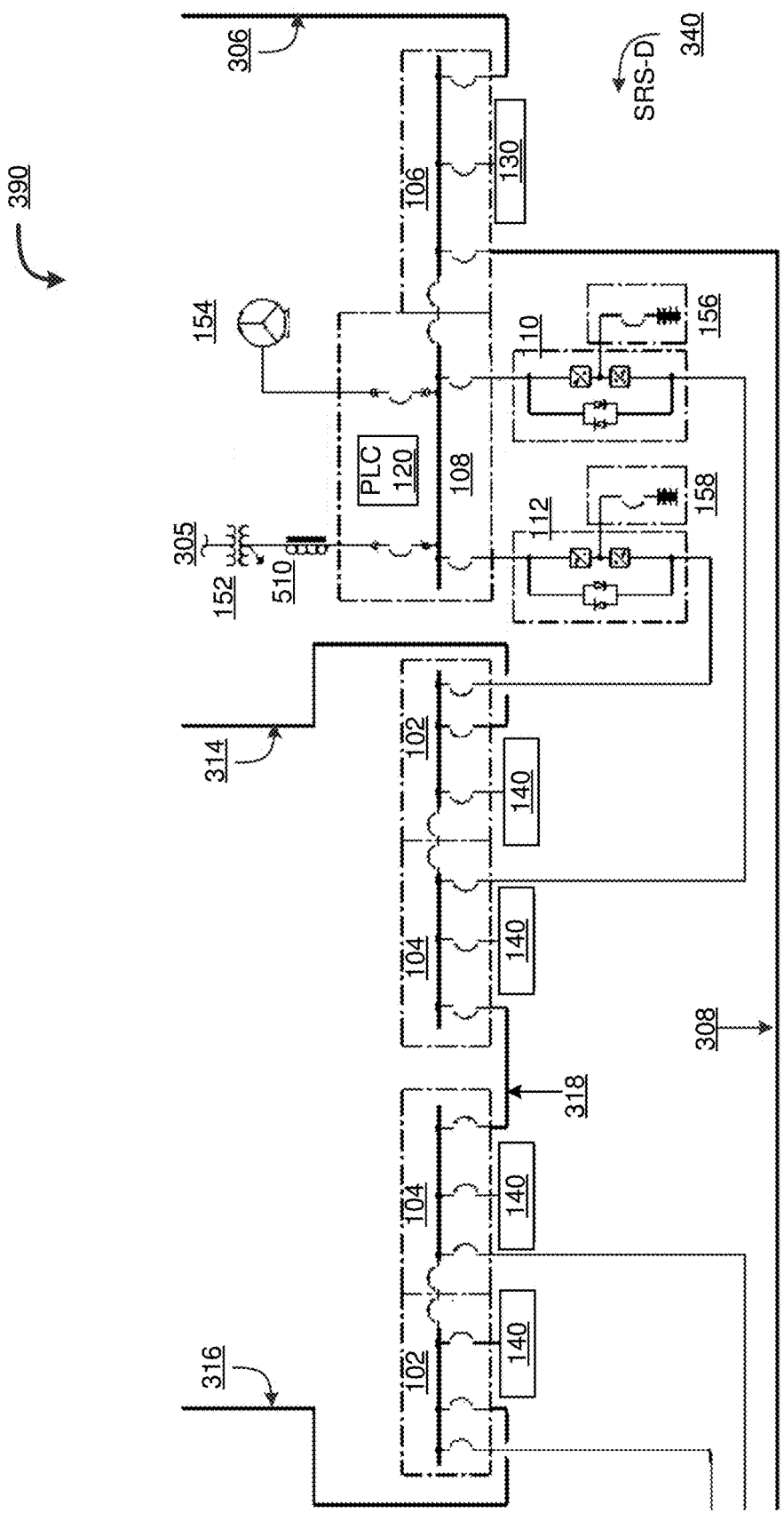

FIGS. 3B-3E are magnified views of the ring bus SRS 300 of FIG. 3A. FIG. 3B shows a magnified view 360 of the ring bus SRS 300 including the SRS-A (310) on the upper left corner of SRS 300, FIG. 3C shows a magnified view 370 of the ring bus SRS 300 including the SRS-B (320) on the upper right corner of SRS 300, FIG. 3D shows a magnified view 380 of the ring bus SRS 300 including the SRS-C (330) on the lower left corner of SRS 300, and FIG. 3E shows a magnified view 390 of the ring bus SRS 300 including the SRS-D (340) on the lower right corner of SRS 300. FIGS. 3A-3C show a medium voltage switchgear 350 for transferring utility power 333 to the utility transformers 152 of each SRS platform. The power connections 301, 303, 305, and 307 connect the medium voltage switchgear 350 to the utility transformers of SRS-A, SRS-C, SRS-D, SRS-B respectively.

Thus, each essential switchboard cabinet 106 and each critical switchboard cabinet 102 or 104 has at least two circuit breaker and one or more bus bars to direct electricity from one or more sources of electrical power to electrical loads. The examples of electric loads are transformers, power distributions units, control equipment, and, ultimately, to individual electrical system loads. The bus bars of the critical switchboard cabinets of each SRS electrical power distribution platform can be connected in series to form a section of the critical electrical power ring bus. Likewise, when there are more than one essential switchboard cabinets in a SRS electrical power distribution platform, the bus bars of the essential switchboard cabinets of the SRS electrical power distribution platform can be connected in series to form a section of the essential electrical power ring bus.

As an example, the ring bus SRS 300 has a total of four SRS electrical power distribution platforms 100 in a loop configuration. The ring bus SRS 300 has a first and second electrical connections going from essential switchboard cabinets 106 of a first SRS electrical power distribution platform to the essential electrical power ring bus and then going to essential switchboard cabinets 106 of a second and a fourth SRS electrical power distribution platforms. The connections are configured to have over current protection including a circuit breaker and cabling sized to have sufficient power to support a portion of a total essential loads of the second SRS electrical power distribution platform. The second electrical power distribution platform also has a fifth electrical connection to the essential electrical power ring bus coming from essential switchboard cabinets of a third SRS electrical power distribution platform. The fifth connection is configured to have over current protection including a circuit breaker and cabling sized to provide sufficient power. The first and third electrical power distribution platforms are configured to collectively power the total essential loads of the second electrical power distribution platform electrically in parallel.

Also, as an example, the ring bus SRS 300 has a total of four SRS electrical power distribution platforms 100 in a loop configuration. The ring bus SRS 300 has a first electrical connection going from the essential switchboard cabinets of the first SRS electrical power distribution platform to the essential electrical power ring bus and then going to the essential switchboard cabinets of the second SRS electrical power distribution platform. The first electrical connection can be configured to have over current protection including a circuit breaker and cabling sized to deliver sufficient power to provide a first portion of a total essential loads of the second SRS electrical power distribution platform. The second SRS electrical power distribution platform also can have an eighth electrical connection to the essential electrical power ring bus coming from the essential switchboard cabinets of a third SRS electrical power distribution platform. The eighth electrical connection can be configured to have over current protection including a circuit breaker and cabling sized to have sufficient power to provide a second portion of the total essential loads of the second SRS electrical power distribution platform. The first SRS electrical power distribution platform and the third SRS electrical power distribution platforms can be configured to collectively power the total essential loads of the second SRS electrical power distribution platform in parallel. The circuit breakers coupling the essential switchboard cabinets to essential electrical power ring bus may have a rating to support the normal operation of the ring bus SRS and to protect the SRS power distribution platforms in the event of a fault. The electrical connections in different segments of the essential electrical power ring bus can be adjusted in size (cable thickness) to support the currents during the normal operation and as well have protection against fault currents.

Likewise, the ring bus SRS 300 has a third and fourth electrical connections going from critical switchboard cabinets of the first SRS electrical power distribution platform to the critical electrical power ring bus and then going to critical switchboard cabinets of the second and fourth SRS electrical power distribution platform. The connections are configured to have over current protection including a circuit breaker and cabling sized to have sufficient power to support less than the total critical equipment loads of the second SRS electrical power distribution platform. The second electrical power distribution platform also has a sixth electrical connection to the critical electrical power ring bus coming from critical switchboard cabinets of the third SRS electrical power distribution platform. The sixth connection is configured to have over current protection including a circuit breaker and cabling sized to provide sufficient power. The first and third electrical power distribution platforms are configured to collectively power the total critical equipment loads of the second electrical power distribution platform electrically in parallel.

Also, as an example, the ring bus SRS 300 can have a third electrical connection going from the critical switchboard cabinets of the first SRS electrical power distribution platform to the critical electrical power ring bus and then going to the critical switchboard cabinets of the second SRS electrical power distribution platform. The third electrical connection can be configured to have over current protection including a circuit breaker and cabling sized to deliver sufficient power to provide a first portion of the total critical equipment loads of the second SRS electrical power distribution platform. The second SRS electrical power distribution platform also can have a ninth electrical connection to the critical electrical power ring bus coming from the critical switchboard cabinets of the third SRS electrical power distribution platform. The ninth electrical connection can be configured to have over current protection including a circuit breaker and cabling sized to have sufficient power to provide a second remaining portion of the total critical equipment loads of the second SRS electrical power distribution platform. The first and third SRS electrical power distribution platforms are configured to collectively power the total critical equipment loads of the second SRS electrical power distribution platform in parallel. The circuit breakers coupling the critical switchboard cabinets to critical electrical power ring bus may have a rating to support the normal operation of the ring bus SRS and to protect the SRS power distribution platforms in the event of a fault. The electrical connections in different segments of the critical electrical power ring bus can be adjusted in size (cable thickness) to support the currents during the normal operation and as well have protection against fault currents.

As discussed, the first SRS electrical power distribution platform can have a first critical switchboard cabinet 102 and a second critical switchboard cabinet 104 coupled to each other via a first set of two normally closed isolation circuit breakers 113 and 115. The first critical switchboard cabinet has double inputs of conditioned continuous electrical power coming in 1) via a second set of two normally closed isolation circuit breakers coupled to a first static UPS unit of the first SRS electrical power distribution platform, and 2) via a third set of two normally closed isolation circuit breakers coupled to the critical electrical power ring bus, the critical electrical power ring bus then coupled through a fourth set of two normally closed isolation circuit breakers to the second static UPS unit of a second SRS electrical power distribution platform. The first critical switchboard cabinet has a first output circuit breaker going out to the critical loads.

Likewise, the second critical switchboard cabinet 104 in the first SRS electrical power distribution platform has double inputs of conditioned continuous electrical power coming in 1) via a fifth set of two normally closed isolation circuit breakers coupled to a third static UPS unit of the first SRS electrical power distribution platform, and 2) via a sixth set of two normally closed isolation circuit breakers coupled to the critical electrical power ring bus. The critical electrical power ring bus then coupled through a seventh set of two normally closed isolation circuit breakers to a fourth static UPS unit of the second SRS electrical power distribution platform. The second critical switchboard cabinet has a second output circuit breaker going out to the critical loads.

The critical switchboard cabinets of the first SRS electrical power distribution platform are coupled via two normally closed isolation circuit breakers between each two critical switchboard cabinets to electrically connect the critical switchboard cabinets of the first SRS electrical power distribution platform, and to close the critical electrical power ring bus inside the first SRS electrical power distribution platform. One or more normally closed isolation circuit breakers connect, via the critical electrical power ring bus, the critical switchboard cabinets of the first SRS electrical power distribution platform to the critical switchboard cabinets of the second SRS electrical power distribution platform, and closes the first segment of the critical electrical power ring bus between the first SRS electrical power distribution platform and the second SRS electrical power distribution platform and potentially supplies power from the second SRS electrical power distribution platform to the critical loads associated with the first SRS electrical power distribution.

The critical switchboard cabinets of each SRS electrical power distribution platform are electrically connected through circuit breakers to the static UPS units, and are connected through circuit breakers to the critical electrical loads to provide conditioned continuous AC power to critical electrical loads that require conditioned continuous AC power from the static UPS units.

The essential switchboard cabinets of first SRS electrical power distribution platform are coupled in series and closes the essential electrical power ring bus inside the first SRS electrical power distribution platform. One or more normally closed isolation circuit breakers are connects, via the essential electrical power ring bus, the essential switchboard cabinets of the first SRS electrical power distribution platform to the essential switchboard cabinets of the second SRS electrical power distribution platform and closes the first segment of the essential electrical power ring bus between the first SRS electrical power distribution platform and the second SRS electrical power distribution platform, and potentially supplies power from the second SRS electrical power distribution platform to the essential loads associated with the first SRS electrical power distribution. The essential loads are not coupled to the static UPS units because they are configured to tolerate momentary power outage and do not require conditioned continuous AC electric power. As an example, one or more SRS electrical distribution platforms can have a single essential switchboard cabinet and this single essential switchboard cabinet can couple through two separate electrical connections to the essential switchboard cabinets of two other SRS electrical distribution platforms.

Figure 4:
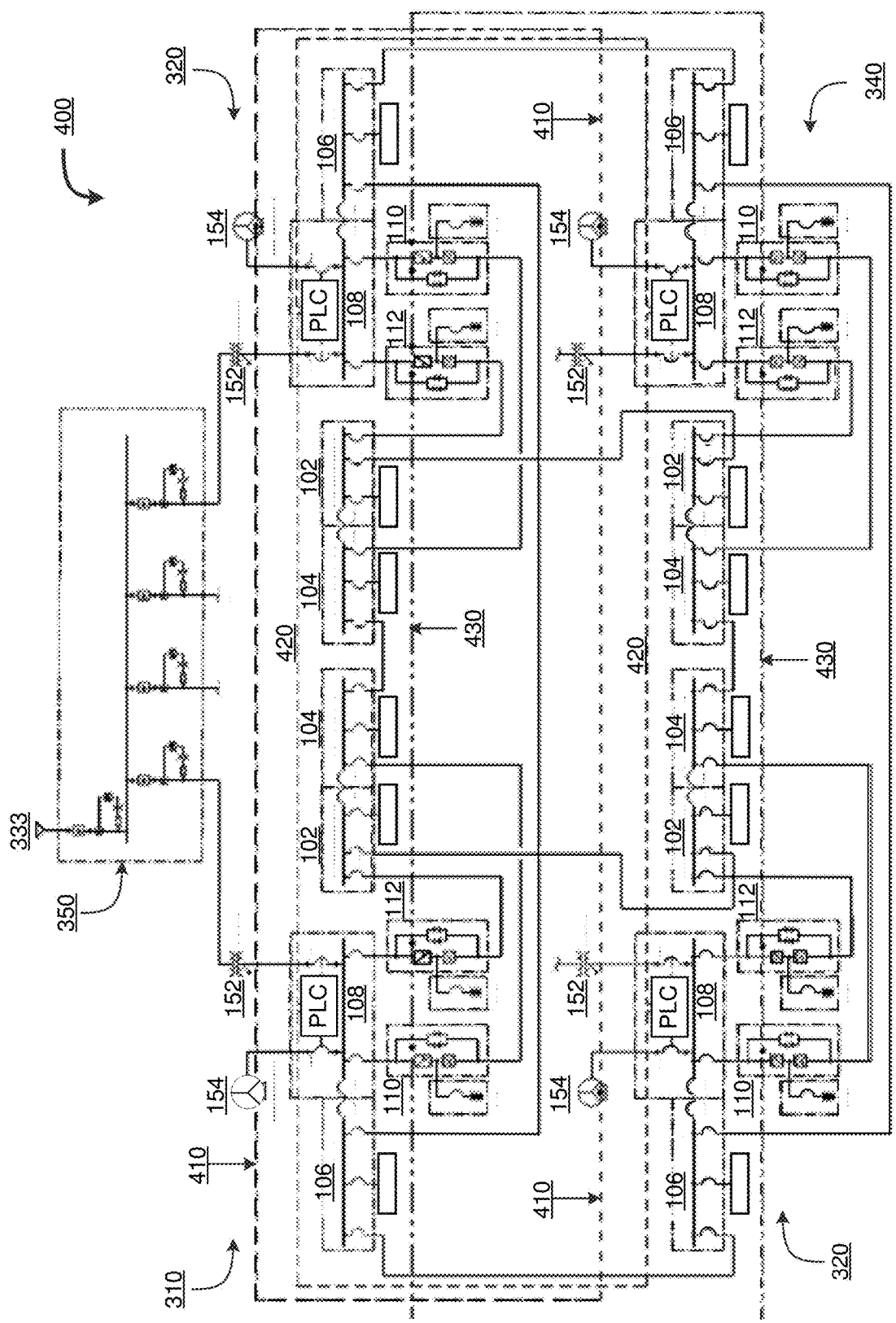
FIG. 4 is a single line diagram showing the communication interconnections between controllers of four SRS power distribution platforms.

FIG. 4 is a single line diagram showing the SRS control interconnections. Programmable logic controllers (PLCs) 120 control the connection to the electrically operated main circuit breakers. The first UPS CAN_BUS communication loop 430 allows each of the static UPSs to communicate with each other to allow synchronization and sharing powering the loads. The second CAN_BUS network 410 provides a communication and control network between all diesel generators 154 such that all diesel generators can synchronize and share powering of the loads. The generator control system, UPS control system, and PLC control system also cooperate together by each of these systems communicating with the other systems. All of the UPS operate in synchronicity. This allows power to be supplied by all three power supplies that connect to the switchboard. The UPS controllers will adjust the power being supplied if that UPS is supplying the loads of two switchboards. When the multiple SRS modular power centers are connected together the UPSs act as effectively connected to the same input source and the same output distribution bus. The SRS platforms 310, 320, 330, and 340 in the ring SRS of 400 either receive electrical power from a single utility line through utility transformers 152 or through diesel generators 154 such that at any time the SRS platforms are either all connected to the utility line or all connected to the diesel generators 154 dedicated for each SRS platform. The third CAN_BUS network 420 provides a communication and control network between all PLCs of the main switchboards 108 such that all SRS platforms simultaneously switch between diesel generator power and utility power.

PLCs located in each SRS main switchboard control their respected transfer pair circuit breakers.

UPS controls are located within each UPS. One UPS will become the master UPS with the other UPS slaving to the master. The UPS controls are tied together by the first communication network 430. The ring bus SRS uses static uninterruptible power supplies as opposed to rotary uninterruptible power supplies.

UPS controls are located within each UPS. One UPS will become the system master UPS with the other UPSs slaving themselves to the master. The UPS controls are tied together by a CAN_BUS control network. ISO 11898 defines the CAN_BUS standards.

Generator Controls are located within each diesel generator. The generator controllers can be connected together by a CAN-BUS network. ISO 11898 defines the CAN_BUS standards.

The PLCs in an SRS system are tied together to ensure that all four modules are all on utility power or generator power.

This is required to insure the synchronization of the power sources. Controls for the four diesel generators 154 are connected together by a CAN_BUS network 410. The CAN_BUS network 410 is installed as a ring bus so that communications between the generators can continue if any segment in the ring is broken. The two UPSs on each SRS modular platform are connected together along with all of the other UPSs on the other SRS modular platforms. The UPSs communications are on a CAN_BUS network 430. The CAN_BUS 430 cooperates as a ring bus so that communications between the UPSs can continue if any segment in the ring is broken.

Therefore, the ring bus SRS 300 can have a first CAN_BUS network 430 that couples the controllers of the static UPS units of the SRS electrical power distribution platforms 100 to communicate and synchronize the static UPS units of the SRS electrical power distribution platforms and provide power sharing among the critical loads. The controllers of the static UPS units of the SRS electrical power distribution platforms 100 synchronize the voltages, frequencies, and phases of the SRS electrical power distribution platforms contributing conditioned continuous AC electrical power to the critical electrical power ring bus. The controllers of the static UPS units of the SRS electrical power distribution platforms are also configured to analyze and determine a load sharing model that each static UPS unit should be supplying for a segment of the critical electrical power ring bus such that a conditioned continuous AC electric power drawn from each segment of the of the critical electrical power ring bus is essentially supplied by the UPS units to that segment. In an example, an SRS power distribution platform can have one or more static UPS units per critical switchboard cabinets.

Each critical electrical power ring bus segment is designated so that a power supply input of conditioned AC power comes from one or more static UPS units into the designated critical electrical power ring bus segment through one or more critical switchboard cabinets. Each critical electrical power ring bus segment is also designated such that conditioned continuous AC power that is directed to critical loads being powered by the designated critical electrical power ring bus segment is essentially equal to the supplied power.

Therefore, each one of the static UPS unit of the SRS electrical power distribution platform includes a controller. The controllers of the static UPS units are configured to synchronize a voltage, frequency, and phase of the UPS units coupled to the critical electrical power ring bus. The controllers are also configured to analyze and determine a load sharing model that each static UPS unit should be supplying for a segment of the critical electrical power ring bus such that a conditioned continuous AC electric power drawn from each segment of the of the critical electrical power ring bus is essentially supplied by the UPS units to that segment. The ring bus SRS can be configured to place critical electric loads close to the their comparable AC electric power suppliers. For example, the AC electrical power drawn by critical electrical loads in a segment of the critical electrical power ring bus can be supplied by the critical switchboard cabinets coupled that section and thus minimizing the flow of electrical current between segments of the critical electrical power ring bus. In another example, the AC electrical power drawn by the critical electrical loads coupled to a critical switchboard cabinet can be essentially supplied by the same critical switchboard cabinet. The SRS power distribution platforms of a ring bus SRS may be arranged in an order such that when one or more SRS power distribution platform fails, partially or completely, and AC electrical power of the critical electrical loads coupled to the failed SRS power distribution platform is supplied by one or more other SRS power distribution platform, the electrical current flow in the segments of the critical electrical power ring bus stays within a predefined limit.

Thus, at least one control system associated with the UPS units of each electrical power distribution platform can communicate with each other over a communication and control network and can synchronize a frequency and phase of a voltage being supplied by the UPS units to each critical electrical bus segment.

Additionally, the ring bus SRS can be configured to place essential electrical loads close to the their comparable AC electric power suppliers. For example, the AC electrical power drawn by essential electrical loads in a segment of the essential electrical power ring bus can be supplied by the essential switchboard cabinets coupled that section and thus minimizing the flow of electrical current between segments of the essential electrical power ring bus. In another example, the AC electrical power drawn by the essential electrical loads coupled to an essential switchboard cabinet can be essentially supplied by the same essential switchboard cabinet. The SRS power distribution platforms of a ring bus SRS may be arranged in an order such that when one or more SRS power distribution platform fails, partially or completely, and AC electrical power of the essential electrical loads coupled to the failed SRS power distribution platform is supplied by one or more other SRS power distribution platform, the electrical current flow in the segments of the essential electrical power ring bus stays within a predetermined limit.

Thus, a second CAN_BUS network 410 couples controllers of diesel generators of the SRS electrical power distribution platforms to communicate and synchronize AC electrical voltages, frequencies, and phases from the diesel generators 154 and to provide power sharing among the critical electrical loads and the essential electrical loads.

Additionally, a third CAN_BUS network 420 couples the PLC controller of the main switchboard cabinet of the SRS electrical power distribution platforms to communicate and to synchronously switch together from coupling to utility AC electrical power to coupling to diesel generator AC electrical power and back from diesel generator AC electrical power to utility AC electrical power such that the SRS electrical power distribution platforms are either on diesel generator AC electrical power or on utility AC electrical power. Therefore, static UPS units of the SRS electrical power distribution platforms act as effectively connected to a same input source and a same output distribution bus.

One or more control circuitry in each SRS electrical power distribution platform 100 is configured to synchronize electrical power of the SRS electrical power distribution platforms to make sure the electric power of the SRS electrical power distribution platforms are synchronized when they couple to the ring buses.

Figure 5:
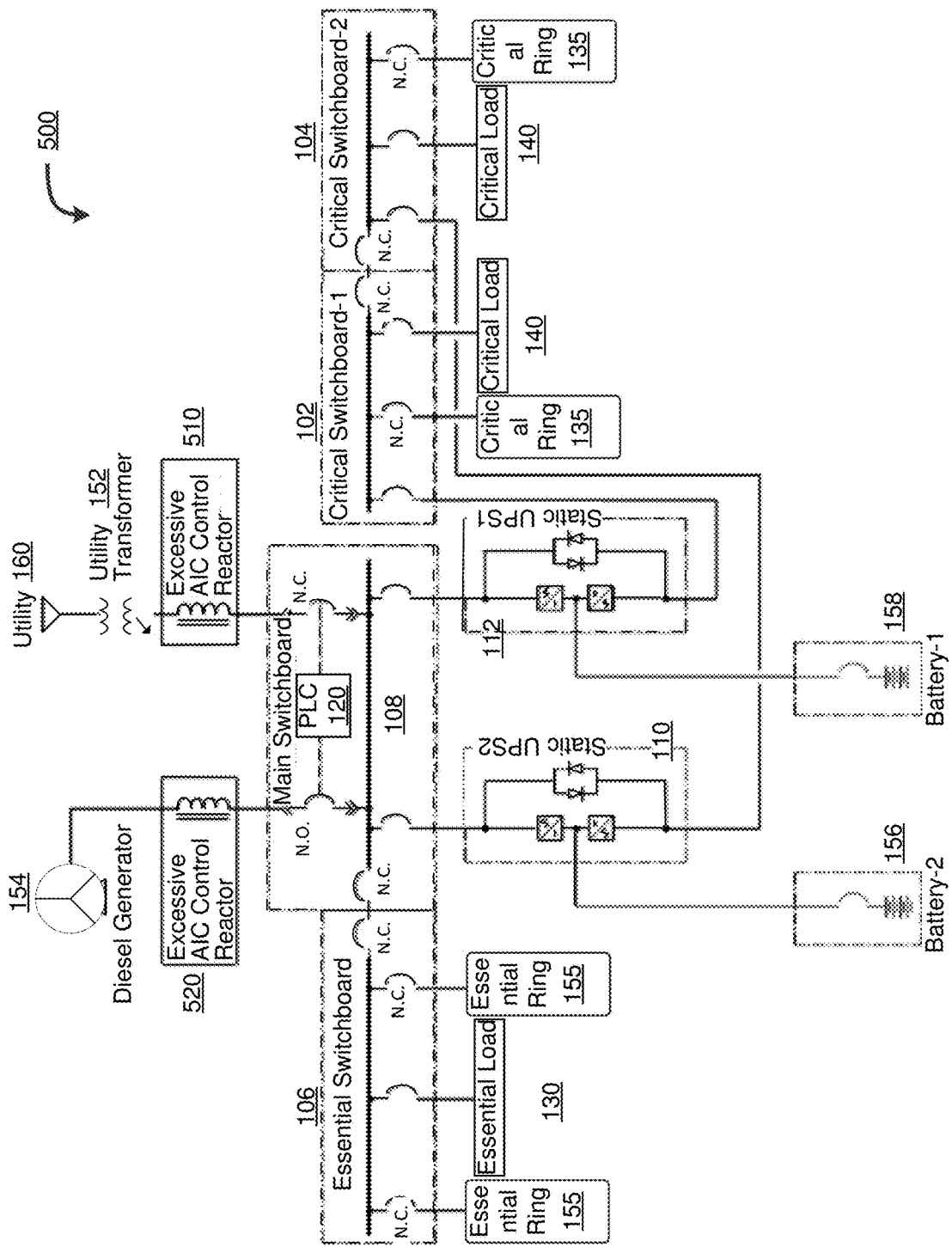
FIG. 5 is a single line diagram showing a SRS power distribution platform with the excessive AIC line reactor connected to the AC sources of power and in position to limit a maximum amount of fault current that can be generated in the system.

FIG. 5 is a single line diagram showing a single SRS power distribution module 500. In addition to the standard equipment described in FIG. 1, two line reactors 510 and 520 have been added between the utility transformer, the diesel generator and the main switchboard, which introduces in-line reactors at the AC source of power to reduce the maximum possible short circuit currents. Note, in an embodiment, each of the four SRS power distribution modules, would have its own excessive AIC line reactor connected to the AC sources of power and in position to limit a maximum amount fault current that can be generated in the system. In general, the ring bus SRS design incorporates a high impedance, high efficiency utility transformer for each SRS power center. The high impedance of the transformer will limit the incoming AC short circuit currents. The inrush currents shall be limited so that the AIC (amp incoming current) ratings of the SRS equipment can be reduced to nominal ratings. In situations where excessive AC short circuit currents are present an additional line reactor can be installed to further reduce the magnitude of the short circuit currents. The excessive AIC line reactor is needed to reduce the systems short circuit amp when the utility short circuit amps are excessively high. The excessive AC control reactor (choke) is connected to the AC power sources of either the diesel generator 154 or is incorporated to the main AC power transformer 152. The main AC power transformer on the secondary side has its impedance increased, such as doubling the impedance, which will then reduce the maximum amount of fault current possible out of that AC power source. On the primary coil side, potentially add a capacitor to counterbalance the increased inductance of the power factor main AC power transformer presents to the electrical power grid. The choke does not couple to the output of the static UPS units as it does not need to because the maximum fault current would be 150% current.

Electrical impedance is the measure of the opposition that a circuit presents to a current when a voltage is applied. The magnitude of impedance is the ratio of the voltage amplitude to the current amplitude, where the percent of impedance is peak voltage divided by peak electrical current. Where the utility transformer connecting to the utility power input is a high impedance transformer with greater than 5% impedance and typically between up to 9% impedance so as to eliminate any need for an AIC inductive line reactor in order for that impedance to limit the maximum amount of total fault current in the system that is capable of being there prior to some over current action such as a circuit breaker actuating.

It is intended that the line reactors as shown be used with installations that have excessively high short circuits currents are presented to the SRS main switchboard. The in-line reactor locations are tied to the transformer and the diesel generator AC power sources and no in-line reactors/chokes are directly connected to an output of the static UPS.

In addition to isolation circuit breakers, the system has additional fault detection equipment to protect for differential protection. The differential protection system measures electrical current flow into bus and out of bus. When the differential bus protection senses a differential in current between the two above a set threshold then that section/bus is immediately isolated by tripping some differential bus protection circuit breakers. The differential protection system stops multiple isolation circuit breakers, in series, tripping all at the same time sometimes causing multiple electrical buses to be isolated until the electrical bus starting the electrical overload condition is found/determined. Unlike Ground Fault Interruption system that has time delay of needing to sense the differential current for X amount of time before allowing a tripping of a GFI breaker, the differential protection system breaks/trips without time delay when the differential current exceeding the threshold is detected. Thus, the electrical fault is detected and the differential bus protection system isolates a single bus section (segment) with the fault immediately so that the rest of electrical distribution system continues to operate while a fault occurred on a single bus.

An exemplary computing type system for implementing the design includes a general-purpose computing device in the form of a desktop or laptop computer, a tablet, a programmable logic controller or other programmable computing device. Any application and other scripted code components may be stored on a non-transitory computing machine-readable medium which, when executed on the computing device causes the computing device to perform those functions. The applications including program modules may be implemented as logical sequences of software code, hardware logic circuits, and any combination of the two, and portions of the application scripted in software code are stored in a non-transitory computing device readable medium in an executable format. In an embodiment, the hardware logic consists of electronic circuits that follow the rules of Boolean Logic, software that contain patterns of instructions, or any combination of both.

Some portions of the detailed descriptions which follow are presented in terms of algorithms/routines and symbolic representations of operations on data bits within a computer memory. These algorithmic descriptions and representations are the means used by those skilled in the data processing arts to most effectively convey the substance of their work to others skilled in the art. An algorithm/routine is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms/routine of the application including the program modules may be written in a number of different software programming languages such as C, C++, Java, HTML, or other similar languages.

Figure 6:
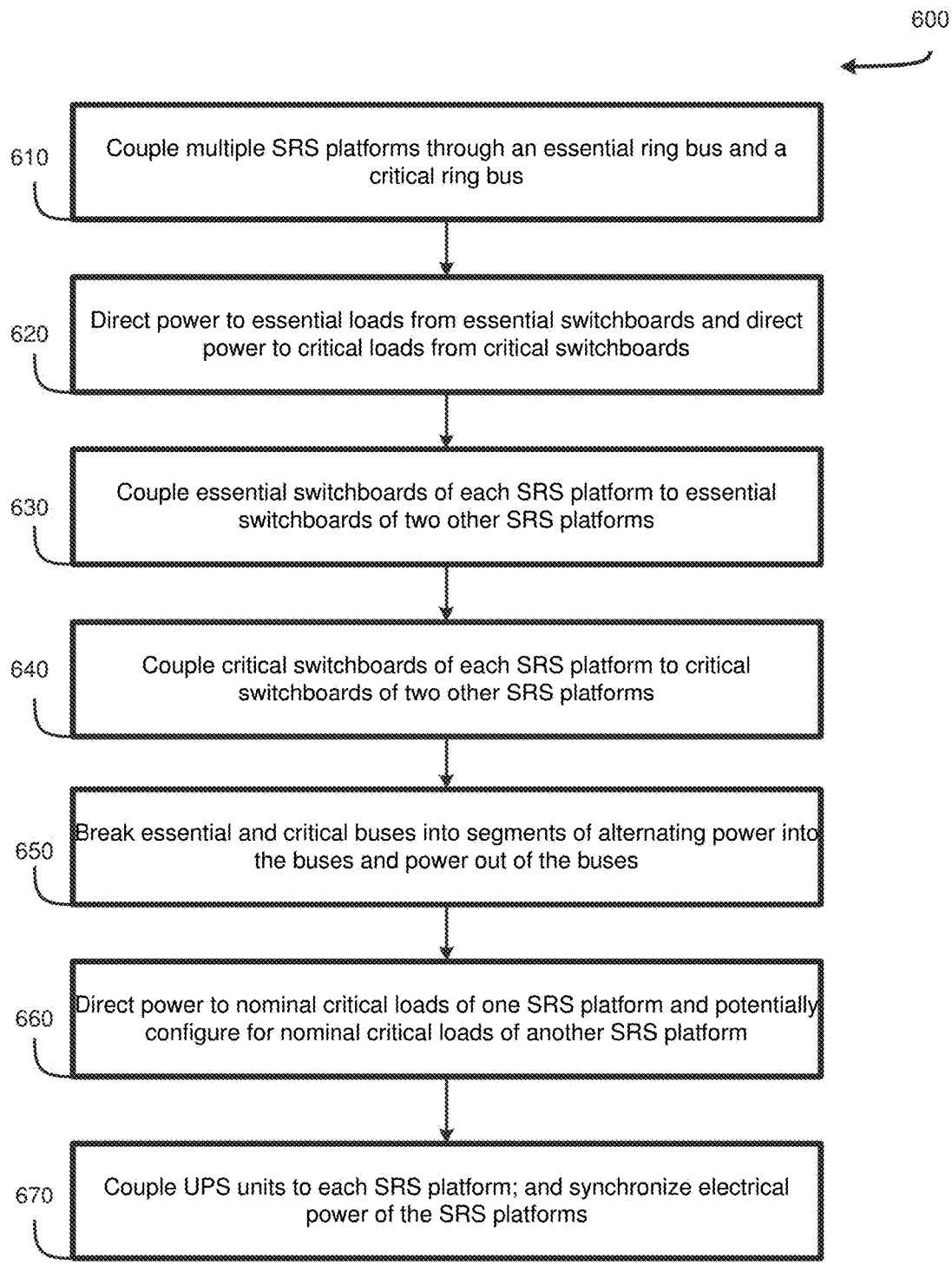
FIG. 6 illustrates a flow graph of an example method of operating and ring bus Shared Resource System.

FIG. 6 illustrates a flow graph of an example method of operating and ring bus Shared Resource System. The method 600 can be used for operating an example ring bus SRS 300 of FIG. 3A or FIG. 7. Multiple SRS platforms are coupled to each other through an essential electrical power ring bus and a critical electrical power ring bus (610). As shown in FIG. 3A, the ring bus SRS 300 include four SRS electrical power distribution platforms which are SRS-A (310), SRS-B (320), SRS-C (330), and SRS-D (340). The essential switchboard cabinets 106 of the four SRS platforms are coupled through the essential electrical power ring bus segments 302, 304, 306, and 308 to each other. Likewise, the critical switchboard cabinets 102 or 104 of the four SRS platforms are also coupled through critical electrical power ring bus segments 312, 314, 316, and 318 to each other.

Power is directed from essential switchboard cabinets 106 to essential electrical loads and likewise, power is directed from critical switchboard cabinets 102 or 104 to critical electrical loads (620). For example, as shown in FIG. 3A, each essential switchboard 106 is coupled to an essential load of each SRS platform through essential load connection 130 and each critical switchboard 102 or 104 is connected to a critical load of each SRS platform through critical load connection 140. Multiple essential loads through multiple essential load connections 130 can be coupled to each essential switchboard cabinet and Multiple critical loads through multiple critical load connections 140 can be coupled to each critical switchboard cabinet.

The essential switchboard cabinets of each SRS platform are coupled to essential switchboards of two other SRS platforms (630). The essential switchboard cabinets can couple via connecting to the essential electrical power ring bus to essential switchboards other SRS platforms. For example, as shown in the ring bus SRS 300 of FIG. 3A, the essential switchboard cabinet 106 of SRS-B platform (320) can connect to the essential electrical power ring bus (segment 306) through a normally closed isolated circuit breaker and then through another normally closed isolation circuit breaker to the essential switchboard 106 in the neighboring SRS-D (340) platform. Similarly, the essential switchboard cabinet 106 of SRS-B platform (320) can connect to the essential electrical power ring bus (segment 304) through a normally closed isolated circuit breaker and then through another normally closed isolation circuit breaker to the essential switchboard 106 in another neighboring SRS-A (310) platform. Since in this configuration each essential switchboard 106 is coupled to the essential switchboard 106 of the neighboring SRS platforms, all essential switchboards are coupled to each other in this ring bus configuration.

The critical switchboard cabinets of each SRS platform are coupled to critical switchboards of two other SRS platforms (640). The critical switchboard cabinets can couple via connecting to the critical electrical power ring bus to critical switchboards other SRS platforms. For example, as shown in the ring bus SRS 300 of FIG. 3A or the ring bus SRS 700 of FIG. 7, the critical switchboard cabinet 102 of SRS-B platform (320) can connect to the critical electrical power ring bus (segment 314) through a normally closed isolated circuit breaker and then through another normally closed isolation circuit breaker to the critical switchboard 102 in the neighboring SRS-D (340) platform. Similarly, the critical switchboard cabinet 104 of SRS-B platform (320) can connect to the critical electrical power ring bus (segment 312) through a normally closed isolated circuit breaker and then through another normally closed isolation circuit breaker to the critical switchboard 104 in another neighboring SRS-A (310) platform. Since in this configuration each critical switchboard 102/104 is coupled to the critical switchboard 102/104 of the neighboring SRS platforms and the critical switchboards 102 and 104 of each SRS platform are coupled to each other, all critical switchboards are coupled to each other in this ring bus configuration. The SRS power distribution platforms in ring bus SRS 700 of FIG. 7 show only one critical switchboard cabinet 102 with no second critical switchboard cabinet 104. Thus, in ring bus SRS 700 of FIG. 7, all the critical electrical power ring bus connections described above for FIG. 3A as coupled to the critical switchboard cabinet 104, are in fact coupled to the critical switchboard 102 as well. Also, the SRS power distribution platforms in ring bus SRS 700 does not show separate essential switchboard cabinets 106 or main switchboard cabinets 108 but instead shows a switchboard cabinet 107 which is a combination of the essential switchboard cabinets 106 and main switchboard cabinets 108.

The essential electrical power ring bus is divided into two or more segments. Also, the critical electrical power ring bus is divided into two or more segments. The sources of power supplied to the essential electrical power ring bus and critical electrical power ring bus as well as power loads extracted from the essential electrical power ring bus and critical electrical power ring bus are alternated (650). As an example, FIGS. 3A-3E show that essential switchboards of each SRS platform can in fact be part of the essential electrical power ring bus and similarly, the critical switchboards of each SRS platform can be part of the critical electrical power ring bus. Also, shown in FIGS. 3A-3E, each switchboard cabinet both receives electric power through a circuit breaker from a power source (utility grid, diesel generator) and supplies electrical power to the loads that are coupled through circuit breakers to the switchboards. The couplings of the sources of power and the couplings of the loads can be alternated and assigned in a calculated scheme such that keeping large loads close to large supplies of power and thus reducing the amount of electric current in the critical electrical power ring bus and the essential electrical power ring bus.

Each SRS electrical power distribution platform directs electrical power to its nominal critical electrical loads; and additionally each SRS electrical power distribution platform is configured to provide electrical power to another SRS electrical power distribution platform (660). As an example, the nominal critical electrical loads of an SRS electrical power distribution platform are the loads that are coupled to the critical switchboard cabinets of that SRS electrical power distribution platform. Thus, each SRS electrical power distribution platform supplies electrical power to its nominal critical electrical loads. Each SRS platform is also configured in electrical connection and power capacity to supply electrical power to the nominal critical electrical loads of other SRS platforms.

One or more Uninterruptable Power Supply (UPS) units are coupled to each SRS power distribution platform. Additionally, the electrical power supplied by the SRS power distribution platforms are synchronized (670). The UPS units are coupled to the critical switchboard cabinets that supply electrical AC power to critical electrical loads because critical electrical load require conditioned continuous electrical AC power and they cannot sustain power loss. The electrical voltage, current, and power of all critical switchboards of the SRS platforms are coupled to each other through the critical electrical power ring bus and thus they require synchronization. Likewise, the electrical voltage, current, and power of all essential switchboards of the SRS platforms are coupled to each other though the essential electrical power ring bus and thus they require synchronization. As described for FIG. 4, there can be a different communication networks between SRS platforms. For example, the diesel generators can communicate through network 410 and synchronize the voltages supplied to the essential switchboards, the UPS units can communicate through network 430 and synchronize the voltages supplied to the critical switchboards, and the PLCs in the main switchboards can communicate through network 420 such that all SRS platforms can simultaneously switch between utility power and diesel generator power. The utility AC power supplied to all SRS platforms is in fact synchronized because all SRS platforms connect to a single utility line.

Electrical loads can be arranged into load groups and each load group can be assigned to a different SRS platform. Each load group can include one or more of the critical and essential loads.

Each SRS platform has its own designated load group including essential and critical loads that are connected to the essential and critical switchboards of the SRS platform. Each SRS platform can be configured to receive an amount of power which is more that the power required by its designated loads. The ring bus segments between two SRS platforms can also be designed to handle more current that generally passes when all SRS platforms are functioning such that if any switchboard in a SRS platform fails the other SRS platforms can supply power such that no load is cut off power.

The datacenter industry is beginning to realize the benefits of the early industrial revolution. Standardized modular power center designs provide some of the same benefits to design and construction personnel. Instead of hand-building custom electrical systems for each datacenter, the modular approach allows for greater deployment speed, improved quality and lower costs, all achieved by using factory-based labor. The use of modules also relieves labor stacking on the job site, while reducing the overall cost of the work by a significant amount. Cost savings can be attained using factory labor. The circuit breakers may not be isolation circuit breakers. Modularizing datacenter components permits control over cost, quality, and schedule.

In one embodiment, a shared resource electrical distribution system can have three or more electrical power distribution platforms as well as two or more ring buses including at least one critical electrical ring bus to distribute conditioned continuous AC electrical power to critical electrical loads and at least one essential electrical ring bus to distribute AC electrical power to essential electrical loads. The electrical power distribution platforms can be coupled to the ring buses.

In one embodiment, the software used to facilitate the algorithms discussed herein can be embodied onto a non-transitory machine-readable medium. A machine-readable medium includes any mechanism that stores information in a form readable by a machine (e.g., a computer). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the design have been shown the design is not to be limited to these embodiments. For example, most functions performed by electronic hardware components may be duplicated by software emulation. Thus, a software program written to accomplish those same functions may emulate the functionality of the hardware components in input-output circuitry. The type and/or number of cabinet may vary, etc. The design is to be understood as not limited by the specific embodiments described herein, but only by scope of the appended claims.

What is claimed is:

1. A ring bus Shared Resource electrical System (SRS), comprising two or more electrical power distribution ring buses including an essential electrical power ring bus and a critical electrical power ring bus;

multiple SRS electrical power distribution platforms, where each SRS electrical power distribution platform has one or more essential switchboard cabinets that have at least a first group of one or more circuit breakers and one or more bus bars to direct electricity to essential electrical loads, and two or more critical switchboard cabinets that have at least a second group of one or more circuit breakers and one or more bus bars to direct electricity to critical electrical loads;

where a first electrical connection and a second electrical connection, via the essential electrical power ring bus, separately interconnect one or more essential switchboard cabinets located in a first SRS electrical power distribution platform to one or more essential switchboard cabinets located in at least two other SRS electrical power distribution platforms, and where a third electrical connection and a fourth electrical connection, via the critical electrical power ring bus, separately interconnect one or more critical switchboard cabinets located in the first SRS electrical power distribution platform to one or more critical switchboard cabinets located in the at least two other SRS electrical power distribution platforms;

where the essential electrical power ring bus is broken into two or more segments consisting of alternating sources of power supplied into the essential electrical power ring bus and power out of the essential electrical power ring bus, where a first segment of the essential electrical power ring bus has power supplied through the first electrical connection from the essential switchboard cabinets from the first SRS electrical power distribution platform as well as power potentially supplied from a fifth electrical connection from the essential switchboard cabinets located in a second SRS electrical power distribution platform, and then power out of that first segment of the essential electrical power ring bus from a sixth electrical connection from the essential switchboard cabinets to respective essential electrical loads;

where the critical electric power ring bus is broken into two or more segments, where a first segment of the critical electrical power ring bus is formed by the interconnections between the critical switchboard cabinets located in the first SRS electrical power distribution platform and the critical switchboard cabinets located in the second SRS electrical power distribution platform, and each of the segments of the critical electrical power ring bus is formed by the interconnections between the critical switchboards cabinets located in the multiple SRS electrical power distribution platforms in a ring loop distribution configuration; and thus, the critical ring electrical power bus is broken into segments consisting of alternating sources of power into the critical electrical power ring bus through the electrical connections to the critical switchboard cabinets and then power out from electrical connections from the critical switchboard cabinets to respective critical electrical loads; and one or more static uninterruptable power supply (UPS) units coupled to the critical switchboard cabinets of each SRS electrical power distribution platform and configured to supply conditioned continuous AC power to the critical electrical loads, where a seventh electrical connection couples the UPS units to the critical switchboard cabinets of the first SRS electrical power distribution platform.

2. The ring bus SRS of claim 1, where the one or more critical switchboard cabinets located in the first SRS electrical power distribution platform are electrically configured to distribute electrical power to critical electrical loads nominally supplied by that first SRS electrical power distribution platform as well as are configured in power capacity and are electrically connected via the critical electrical power ring bus to be able to distribute electrical power to critical electrical loads nominally supplied by the second SRS electrical power distribution platform;

where the ring bus SRS further includes one or more control circuitry units located in each SRS electrical power distribution platform with control circuitry connections between the multiple SRS electrical power distribution platforms and configured to synchronize electrical power of the SRS electrical power distribution platforms to at least the critical electrical loads;

where the first SRS electrical power distribution platform is also electrically configured to distribute electrical power to essential electrical loads nominally supplied by that first SRS electrical power distribution platform as well as is configured in power capacity and are electrically connected to be able to distribute electrical power to essential electrical loads nominally supplied by the second SRS electrical power distribution platform connected via the essential ring electrical power bus, where the first segment of the essential ring electrical power bus is formed between the interconnections between the essential switchboard cabinets located in the first SRS electrical power distribution platform and the essential switchboard cabinets located in the second SRS electrical power distribution platform, where the second segment of the essential ring electrical power bus is formed between the interconnections between the essential switchboard cabinets located in the first SRS electrical power distribution platform and the essential switchboard cabinets located in a third SRS electrical power distribution platform; and thus, the essential electrical power ring bus is also broken into segments consisting of alternating sources of power into the essential electrical power ring bus through the electrical connections to the essential switchboard cabinets and then power out from electrical connections from the essential switchboard cabinets;

where a second segment of the critical electrical power ring bus is formed between the interconnections between the critical switchboard cabinets located in the first SRS electrical power distribution platform and the critical switchboard cabinets located in the third SRS electrical power distribution platform;

wherein the critical switchboard cabinets of the first SRS electrical power distribution platform are coupled via two normally closed isolation circuit breakers between each two critical switchboard cabinets to electrically connect the critical switchboard cabinets of the first SRS electrical power distribution platform, and to close the critical electrical power ring bus inside the first SRS electrical power distribution platform, and where one or more normally closed isolation circuit breakers are used to connect, via the critical electrical power ring bus, the critical switchboard cabinets of the first SRS electrical power distribution platform to the critical switchboard cabinets of the second SRS electrical power distribution platform, and to close the first segment of the critical electrical power ring bus between the first SRS electrical power distribution platform and the second SRS electrical power distribution platform, and where to potentially supply power from the second SRS electrical power distribution platform to the critical loads associated with the first SRS electrical power distribution, where the critical switchboard cabinets of each SRS electrical power distribution platform are electrically connected 1) through circuit breakers to the static UPS units, and 2) through circuit breakers to the critical electrical loads to provide conditioned continuous AC power to critical electrical loads that require conditioned continuous AC power from the static UPS units, where the essential switchboard cabinets of first SRS electrical power distribution platform are coupled in series to close the essential electrical power ring bus inside the first SRS electrical power distribution platform, and where one or more normally closed isolation circuit breakers are used to connect, via the essential electrical power ring bus, the essential switchboard cabinets of the first SRS electrical power distribution platform to the essential switchboard cabinets of the second SRS electrical power distribution platform, and to close the first segment of the essential electrical power ring bus between the first SRS electrical power distribution platform and the second SRS electrical power distribution platform, and where to potentially supply power from the second SRS electrical power distribution platform to the essential loads associated with the first SRS electrical power distribution, where the essential loads are not coupled to the static UPS units and are configured to tolerate momentary power outage.

3. The ring bus SRS of claim 1, further including a main switchboard cabinet in each SRS electrical power distribution platform coupled to two or more sources of AC electrical power and configured to receive AC electrical power from the sources of AC electrical power and to supply AC electrical power 1) through one or more circuit breakers to the static UPS units of the SRS electrical power distribution platform, and 2) via two normally closed isolation circuit breakers to the essential switchboard cabinets of the SRS electrical power distribution platform, where the main switchboard cabinet is configured to at least receive AC electrical power through a first dedicated connection coupled to a diesel generator and also through a second dedicated connection coupled to a utility AC grid, where the first dedicated connection is through an amp incoming current (AIC) line reactor coupled between the main switchboard cabinet and the diesel generator and the second dedicated connection is through either of 1) an AIC line reactor coupled between the main switchboard cabinet and the utility AC grid, or 2) a high impedance transformer having an impedance greater than 5% coupled between the main switchboard cabinet and the utility AC grid, to limit a maximum amount of fault current that can be generated in the SRS electrical power distribution platform, where a Programmable Logic Controller (PLC) in the main switchboard cabinet controls two transfer pair circuit breakers located in the main switchboard cabinet to switch to either receive 1) AC electrical power from the diesel generator through the first dedicated connection, or 2) AC electrical power from the utility grid through the second dedicated connection.

4. The ring bus SRS of claim 1, wherein the multiple SRS electrical power distribution platforms are a total of four SRS electrical power distribution platforms, wherein the four SRS electrical power distribution platforms are connected together through the essential electrical power ring bus and the critical electrical power ring bus in a loop configuration, where the four SRS electrical power distribution platforms each have at least one electrical connection through a circuit breaker to the essential electrical power ring bus, and at least one electrical connection via a circuit breaker to the critical electrical power ring bus, where the essential electrical power ring bus provides electrical connection between essential switchboard cabinets of the SRS electrical power distribution platforms and to carry electrical power between essential switchboard cabinets of the SRS electrical power distribution platforms and to provide power to the essential electrical loads, where the essential electrical loads in the ring bus SRS are connected together by the essential electrical power ring bus and have electrical connections configured to be powered by at least two SRS power distribution platforms, where the critical electrical power ring bus provides electrical connection between critical switchboard cabinets of the SRS electrical power distribution platforms to carry electrical power between critical switchboard cabinets of the SRS electrical power distribution platforms and to provide power to the critical electrical loads, and where the critical electrical loads in the ring bus SRS are connected together by the critical electrical power ring bus and have electrical connections configured to be powered by at least two SRS power distribution platforms, where each segment of the critical electrical power ring bus has an alternating sequence of conditioned continuous AC electrical power coming from the UPS units into that segment of the critical electrical power ring bus and then critical electrical loads drawing AC electrical power out of that segment of the critical electrical power ring bus, where each segment of the essential electrical power ring bus has an alternating sequence of AC electrical power coming from the main switchboard cabinets into that segment of the essential electrical power ring bus and then essential electrical loads drawing AC electrical power out of that segment of the essential electrical power ring bus.

5. The ring bus SRS of claim 1, wherein a first main switchboard cabinet in the first SRS electrical power distribution platform has a first power connection to a first dedicated diesel engine generator to receive electric AC power for the first SRS electrical power distribution platform, and a second power connection through a first dedicated utility service transformer to a utility AC grid to receive electric AC power for the first SRS electrical power distribution platform, where the first power connection and the second power connection are equipped with a first set of two PLC controllable transfer pair circuit breakers that are configured to switch between utility and generator power, where the ring bus SRS further includes a first PLC controller with control circuitry to synchronize an output power of the UPS units of the first SRS electrical power distribution platform with output powers of the UPS units of other SRS electrical power distribution platforms, one or more electrical connections via isolation circuit breakers to the UPS units of the first SRS electrical power distribution platform to provide AC electric power to the UPS units, where the UPS units are coupled through circuit breaker to the critical switchboard cabinets of the first SRS electrical power distribution platform, and where the critical switchboard cabinets of the first SRS electrical power distribution platform are coupled through circuit breaker to the critical electrical loads to provide conditioned continuous AC power of the UPS units of the first SRS electrical power distribution platform to the critical electrical loads, and one or more electrical connections via isolation circuit breakers to the essential switchboard cabinets of the first SRS electrical power distribution platform to provide AC electric power to the essential switchboard cabinets of the first SRS electrical power distribution platform, where the essential switchboard cabinets of the first SRS electrical power distribution platform are coupled through circuit breakers to the essential electrical loads and provide AC electric power to the essential electrical loads;

and wherein a second main switchboard cabinet in the second SRS electrical power distribution platform has a third power connection to a second dedicated diesel engine generator to receive electric AC power for the second SRS electrical power distribution platform, and a fourth power connection through a second dedicated utility service transformer to the utility AC grid to receive electric AC power for the second SRS electrical power distribution platform, where the third power connection and the fourth power connection are equipped with a second set of two PLC controllable transfer pair circuit breakers that are configured to switch between utility and generator power, a second PLC controller with control circuitry to synchronize an output power of the UPS units of the second SRS electrical power distribution platform with the output powers of the UPS units of the other SRS electrical power distribution platforms, one or more electrical connections via isolation circuit breakers to the UPS units of the second SRS electrical power distribution platform to provide AC electric power to the UPS units, where the UPS units are coupled through circuit breaker to the critical switchboard cabinets of the second SRS electrical power distribution platform, and where the critical switchboard cabinets of the second SRS electrical power distribution platform are coupled through circuit breaker to the critical electrical loads and provide conditioned continuous AC power of the UPS units of the second SRS electrical power distribution platform to the critical electrical loads, and one or more electrical connections via isolation circuit breakers to the essential switchboard cabinets of the second SRS electrical power distribution platform to provide AC electric power to the essential switchboard cabinets of the second SRS electrical power distribution platform, where the essential switchboard cabinets of the second SRS electrical power distribution platform are coupled through circuit breakers to the essential electrical loads and provide AC power to the essential electrical loads.

6. The ring bus SRS of claim 5, wherein the multiple SRS electrical power distribution platforms are a total of four SRS electrical power distribution platforms in a loop configuration, where the first electrical connection going from the essential switchboard cabinets of the first SRS electrical power distribution platform to the essential electrical power ring bus and then going to the essential switchboard cabinets of the second SRS electrical power distribution platform is configured to have over current protection including a circuit breaker and cabling sized to have sufficient power to provide a first portion of a total essential loads of the second SRS electrical power distribution platform, the second SRS electrical power distribution platform also has an eighth electrical connection to the essential electrical power ring bus coming from the essential switchboard cabinets of a third SRS electrical power distribution platform and configured to have over current protection including a circuit breaker and cabling sized to have sufficient power to provide a second portion of the total essential loads of the second SRS electrical power distribution platform, where the first SRS electrical power distribution platform and the third SRS electrical power distribution platforms are configured to collectively power the total essential loads of the second SRS electrical power distribution platform in parallel;

wherein likewise, the third electrical connection going from the critical switchboard cabinets of the first SRS electrical power distribution platform to the critical electrical power ring bus and then going to the critical switchboard cabinets of the second SRS electrical power distribution platform is configured to have over current protection including a circuit breaker and cabling sized to have sufficient power to provide a first portion of total critical equipment loads of the second SRS electrical power distribution platform, the second SRS electrical power distribution platform also has a ninth electrical connection to the critical electrical power ring bus coming from the critical switchboard cabinets of the third SRS electrical power distribution platform and configured to have over current protection including a circuit breaker and cabling sized to have sufficient power to provide a second remaining portion of the total critical equipment loads of the second SRS electrical power distribution platform, where the first and third SRS electrical power distribution platforms are configured to collectively power the total critical equipment loads of the second SRS electrical power distribution platform in parallel;

wherein each one of the static UPS unit of the SRS electrical power distribution platform includes a controller, where controllers of the static UPS units are configured to synchronize a voltage, frequency, and phase of the UPS units coupled to the critical electrical power ring bus, and where the controllers are also configured to analyze and determine a load sharing model that each static UPS unit should be supplying for a segment of the critical electrical power ring bus such that a conditioned continuous AC electric power drawn from each segment of the of the critical electrical power ring bus is essentially supplied by the UPS units to that segment.

7. The ring bus SRS of claim 1, wherein the first SRS electrical power distribution platform has a first critical switchboard cabinet and a second critical switchboard cabinet coupled to each other via a first set of two normally closed isolation circuit breakers where the first critical switchboard cabinet has double inputs of conditioned continuous electrical power coming in 1) via a second set of two normally closed isolation circuit breakers coupled to a first static UPS unit in the first SRS electrical power distribution platform, and 2) via a third set of two normally closed isolation circuit breakers coupled to the critical electrical power ring bus, the critical electrical power ring bus then coupled through a fourth set of two normally closed isolation circuit breakers to a second static UPS unit in the second SRS electrical power distribution platform, where the first critical switchboard cabinet has a first output circuit breaker going out to the critical loads;

where the second critical switchboard cabinet in the first SRS electrical power distribution platform has double inputs of conditioned continuous electrical power coming in 1) via a fifth set of two normally closed isolation circuit breakers coupled to a third static UPS unit in the first SRS electrical power distribution platform, and 2) via a sixth set of two normally closed isolation circuit breakers coupled to the critical electrical power ring bus, the critical electrical power ring bus then coupled through a seventh set of two normally closed isolation circuit breakers to a fourth static UPS unit in the second SRS electrical power distribution platform, where the second critical switchboard cabinet has a second output circuit breaker going out to the critical loads;

where the sets of two isolation circuit breakers allow any component to be completely shut down and de-energized without shutting down any of the critical loads.

8. The ring bus SRS of claim 1, wherein each SRS electrical power distribution platform includes at least one main switchboard cabinets, at least two static UPS units, at least two critical switchboard cabinets, at least one essential switchboard cabinets, and a Programmable Logic Controller (PLC) to fully synchronize an electrical voltage, phase, and frequency between SRS electrical power distribution platforms and share electrical power loads among the SRS electrical power distribution platforms, where each main switchboard cabinet is coupled to both a dedicated diesel generator and to AC utility grid, the main switchboard cabinet is also equipped with two transfer pair circuit breakers which is configured to transfer between the AC utility grid and the diesel generator and two isolation circuit breakers for directing the AC electrical power to the UPS units, where each essential switchboard cabinet has two circuit breakers for connection to the essential electrical power ring bus and each critical switchboard cabinet has one circuit breaker for connection to the critical electrical power ring bus.

9. The ring bus SRS of claim 1, wherein each SRS electrical power distribution platform includes at least a pair of loop tie circuit breakers connected to the essential electrical power ring bus and the critical electrical power ring bus, the pair of loop tie circuit breakers are configured to electrically open and put nominally connected SRS electrical power distribution platforms to switch to an island mode operation in an event of multiple generators failure at startup or during operations, where in the island mode operation a controller of each SRS electrical power distribution platform is configured to cause support of only the critical and essential loads directly connected to each SRS electrical power distribution platform, wherein the first SRS electrical power distribution platform has a first critical switchboard cabinet and a second critical switchboard cabinet in series with two normally closed isolation circuit breakers coupling the two critical switchboard cabinets, completely isolating the critical electrical loads of the first critical switchboard cabinet of the first SRS electrical power distribution platform from the second critical switchboard cabinet of the first SRS electrical power distribution platform, allowing the first critical switchboard cabinet and the second critical switchboard cabinet to independently shut down and de-energize.

10. The ring bus SRS of claim 1, wherein each critical switchboard cabinet of the first SRS electrical power distribution platform is coupled to one or more static UPS units of the first SRS electrical power distribution platform and is configured to receive conditioned continuous AC power for the critical electrical loads, where each static UPS unit is coupled to a main switchboard cabinet of the first SRS electrical power distribution platform to receive either AC electrical power from a diesel generator or AC electrical power from AC utility grid, where each critical switchboard cabinet of the first SRS electrical power distribution platform is also coupled to at least one critical switchboard cabinet in another SRS electrical power distribution platforms to receive conditioned continuous AC power from another SRS electrical power distribution platform for the critical electrical loads, where a first CAN_BUS network couples controllers of the static UPS units of the SRS electrical power distribution platforms to communicate and synchronize the static UPS units of the SRS electrical power distribution platforms and provide power sharing among the critical loads, where the controllers of the static UPS units of the SRS electrical power distribution platforms synchronize voltages, frequencies, and phases of the SRS electrical power distribution platforms contributing conditioned continuous AC power to the critical electrical power ring bus, where the controllers of the static UPS units of the SRS electrical power distribution platforms are also configured to analyze and determine a load sharing model that each static UPS unit should be supplying for a segment of the critical electrical power ring bus such that a conditioned continuous AC electric power drawn from each segment of the of the critical electrical power ring bus is essentially supplied by the UPS units to that segment, where a second CAN_BUS network couples controllers of diesel generators of the SRS electrical power distribution platforms to communicate and synchronize AC electrical voltages, frequencies, and phases from the diesel generators and provide power sharing among the critical electrical loads and the essential electrical loads, where a third CAN_BUS network couples a PLC controller of the main switchboard cabinet of the SRS electrical power distribution platforms to communicate and to synchronously switch together from utility AC electrical power to diesel generator AC electrical power and back from diesel generator AC electrical power to utility AC electrical power such that the SRS electrical power distribution platforms are either on diesel generator AC electrical power or on utility AC electrical power, where the static UPS units of the SRS electrical power distribution platforms act as effectively connected to a same input source and a same output distribution bus;

wherein the SRS electrical power distribution platforms are coupled to a single utility AC source, and wherein each static UPS unit is backed up by one or more batteries, where providing battery backed up power to the critical loads when the SRS electrical power distribution platforms switch from utility AC electrical power to diesel generator AC electrical power, supplying conditioned continuous AC electrical power.

11. A method of operating a ring bus Shared Resource electrical System (SRS), comprising:

coupling multiple SRS electrical power distribution platforms through two or more electrical power distribution ring buses including an essential electrical power ring bus and a critical electrical power ring bus, each SRS electrical power distribution platform having one or more essential switchboard cabinets and two or more critical switchboard cabinets;

directing electrical power to essential electrical loads from essential switchboard cabinets and directing electrical power to critical electrical loads from critical switchboard cabinets;

coupling essential switchboard cabinets of each SRS electrical power distribution platform to essential switchboard cabinets of two other SRS electrical power distribution platforms via the essential electrical power ring bus;

coupling critical switchboard cabinets of each SRS electrical power distribution platform to critical switchboard cabinets of the two other SRS electrical power distribution platforms via the critical electrical power ring bus;

breaking the essential electrical power ring bus into segments;

alternating source of power into each segment of the essential electrical power ring bus and power out of that segment of the essential electrical power ring bus to the essential electrical loads;

breaking the critical electrical power ring bus into segments;

alternating source of power into each segment of the critical electrical power ring bus and power out of that segment of the critical electrical power ring bus to the critical electrical loads;

configuring each SRS electrical power distribution platform to distribute electrical power to critical electrical loads nominally supplied by that SRS electrical power distribution platform and to potentially supply electrical power to critical electrical loads nominally supplied by another SRS electrical power distribution platform;

coupling one or more static uninterruptable power supplies (UPS) units to each SRS electrical power distribution platform to provide conditioned continuous AC power for the critical electrical loads; and synchronizing electrical power of the SRS electrical power distribution platforms.

12. The method of claim 11, further comprising configuring each SRS electrical power distribution platform to distribute electrical power to essential electrical loads nominally supplied by that SRS electrical power distribution platform and to potentially supply electrical power to essential electrical loads nominally supplied by another SRS electrical power distribution platform;

coupling the critical switchboard cabinets of each SRS electrical power distribution platform in series and forming the critical electrical power ring bus inside the SRS electrical power distribution platforms;

coupling the essential switchboard cabinets of each SRS electrical power distribution platform in series and forming the essential electrical power ring bus inside the SRS electrical power distribution platforms;

coupling the critical switchboard cabinets of each SRS electrical power distribution platform to the critical switchboard cabinets of another SRS electrical power distribution and forming a segment of the critical electrical power ring bus;

coupling the essential switchboard cabinets of each SRS electrical power distribution platform to the essential switchboard cabinets of another SRS electrical power distribution and forming a segment of the essential electrical power ring bus;

coupling the critical switchboard cabinets of each SRS electrical power distribution platform between the static UPS units of that SRS electrical power distribution platform and the critical electrical loads and providing conditioned continuous AC electrical power from the UPS units to the critical electrical loads;

coupling the essential switchboard cabinets of each SRS electrical power distribution platforms to the essential electrical loads and directing AC electrical power to the essential loads.

13. The method of claim 11, further comprising a main switchboard cabinet in each SRS electrical power distribution platform for coupling the main switchboard cabinet to electrical power sources of 1) AC electrical power from a diesel generator, and 2) AC electrical power from a utility AC grid;

switching between the AC electrical power of the diesel generator and the AC electrical power of the utility grid by a PLC controller and selecting one of the electrical power sources, wherein at each instance of time one of the electrical power sources is coupled to the main switchboard cabinet;

supplying AC electrical power from the selected electrical power source to the static UPS units of the SRS electrical power distribution platform;

limiting a maximum fault current of the SRS electrical power distribution platform by coupling the main switchboard cabinet through 1) an amp incoming current (AIC) line reactor, or 2) a high impedance transformer, to the utility AC grid; and limiting the maximum fault current of the SRS electrical power distribution platform by coupling the main switchboard cabinet through an AIC line reactor to the diesel generator.

14. The method of claim 11, further comprising arranging the essential electrical power ring bus in a first loop configuration and coupling the essential switchboard cabinets of four SRS electrical power distribution platforms to the essential electrical power ring bus;

arranging the critical electrical power ring bus in a second loop configuration and coupling the critical switchboard cabinets of the four SRS electrical power distribution platforms to the critical electrical power ring bus;

directing power to each essential load through the essential electrical power ring bus from at least two essential switchboard cabinets of at least two SRS electrical power distribution platforms;

directing power to each critical load through the critical electrical power ring bus from at least two critical switchboard cabinets of at least two SRS electrical power distribution platforms;

alternating sequences of conditioned continuous AC electrical power from the UPS units directed into the segments of the critical electrical power ring bus and then AC electrical power drawn out of the segments of the critical electrical power ring bus to the critical electrical loads;

alternating sequence of AC electrical power from the main switchboard cabinets directed into the segments of the essential electrical power ring bus and then AC electrical power drawn out of the segments of the essential electrical power ring bus to the essential electrical loads.

15. The method of claim 14, further comprising coupling four SRS electrical power distribution platforms in the first and the loop configurations;

configuring a first electrical connection between the essential switchboard cabinets of a first SRS electrical power distribution platform to the essential switchboard cabinets of a second SRS electrical power distribution platforms to provide AC power for a first portion of total essential loads of the second SRS electrical power distribution platform by the first SRS electrical power distribution platform;

configuring a second electrical connection between the essential switchboard cabinets of a third SRS electrical power distribution platform to the essential switchboard cabinets of the second SRS electrical power distribution platform to provide AC power for a second remaining portion of the total essential loads of the second SRS electrical power distribution platform by the third SRS electrical power distribution platform, wherein the first and the third SRS electrical power distribution platforms collectively provide AC power for the total essential loads of the second SRS electrical power distribution platform;

protecting the first electrical connection and the second electrical connection connections for over current;

configuring a third electrical connection between the critical switchboard cabinets of the first SRS electrical power distribution platform to the critical switchboard cabinets of the second SRS electrical power distribution platform to provide conditioned continuous AC power for a first portion of total critical loads of the second SRS electrical power distribution platform by the first SRS electrical power distribution platform;

configuring a fourth electrical connection between the critical switchboard cabinets of the third SRS electrical power distribution platform to the critical switchboard cabinets of the second SRS electrical power distribution platform to provide conditioned continuous AC power for a second portion of the total critical loads of the second SRS electrical power distribution platform by the third SRS electrical power distribution platform, wherein the first and the third SRS electrical power distribution platforms collectively provide conditioned continuous AC power for the total critical loads of the second SRS electrical power distribution platform;

protecting the third electrical connection and the fourth electrical connection for over current.

16. The method of claim 11, further comprising a first SRS electrical power distribution platform:

coupling a main switchboard cabinet to a dedicated utility service transformer;

coupling the main switchboard cabinet to a dedicated diesel generator;

switching a pair of two transfer pair circuit breakers between the dedicated utility service transformer and the diesel generator;

directing power to the main switchboard cabinet from either 1) the dedicated utility service transformer coupled to a utility AC grid, or 2) the dedicated diesel generator;

coupling the UPS units of the first SRS electrical power distribution platform between the main switchboard cabinet and the critical switchboard cabinets of the first SRS electrical power distribution platform;

directing power from the main switchboard cabinet of the first SRS electrical power distribution platform to the UPS units of the first SRS electrical power distribution platform;

directing conditioned continuous AC power of the UPS units of the first SRS electrical power distribution platform to the critical electrical loads;

coupling the main switchboard cabinet of the first SRS electrical power distribution platform to an essential switchboard cabinet of the first SRS electrical power distribution;

directing AC electrical power to the essential electrical loads.

17. The method of claim 16, further comprising configuring PLC controllers of the main switchboard cabinets of the SRS electrical power distribution platforms for synchronizing electrical phase and frequency of the SRS electrical power distribution platforms and providing load sharing among the SRS electrical power distribution platforms.

18. The method of claim 11, wherein the first SRS electrical power distribution platform has two critical switchboard cabinets further comprising coupling a first and a second critical switchboard cabinets of the first SRS electrical power distribution platform;

providing double inputs of conditioned continuous AC electrical power to the first critical switchboard cabinet of the first SRS electrical power distribution platform through 1) coupling the first critical switchboard cabinet of the first SRS electrical power distribution platform to a first static UPS unit in the first SRS electrical power distribution platform, and 2) coupling the first critical switchboard cabinet of the first SRS electrical power distribution platform to the critical electrical power ring bus and then coupling the critical electrical power ring bus to a second static UPS unit in a second SRS electrical power;

coupling the first critical switchboard cabinet to critical electrical loads;

providing double inputs of conditioned continuous AC electrical power to the second critical switchboard cabinet of the first SRS electrical power distribution platform through 1) coupling the second critical switchboard cabinet of the first SRS electrical power distribution platform to a third static UPS unit in the first SRS electrical power distribution platform, and 2) coupling the second critical switchboard cabinet of the first SRS electrical power distribution platform to the critical ring and then coupling the critical electrical power ring bus to a fourth static UPS unit in the second SRS electrical power;

coupling the second critical switchboard cabinet to the critical electrical loads;

incorporating isolation circuit breakers in the couplings and allowing shutting down and de-energizing of the critical switchboard cabinets of the first SRS electrical power distribution platform without shutting off the critical loads.

19. The method of claim 11, further comprising setting the SRS electrical power distribution platforms to island mode operation when more than one SRS electrical power distribution platform fails at startup or during operation, the island mode operation causing each SRS electrical power distribution platforms to support only the electrical loads assigned to the SRS electrical power distribution platform;

coupling a first and a second critical switchboard cabinets of each SRS electrical power distribution platform via isolation circuit breaker;

allowing the first and second critical switchboard cabinets of each SRS electrical power distribution platform to independently shut down and deenergize.

20. The method of claim 11, wherein synchronizing includes coupling controllers of the static UPS units of the SRS electrical power distribution platforms through a first communication network;

synchronizing all static UPS units of the SRS electrical power distribution platforms including synchronizing voltages, frequencies, and phases of the static UPS units;

analyzing and determining load sharing models for controllers of the static UPS units and applying the load sharing models to each segment of the critical electrical power ring bus; and supplying conditioned continuous AC electrical power from static UPS units to the critical electrical power ring bus segments;

coupling controllers of diesel generators of the SRS electrical power distribution platforms through a second communication network and synchronizing AC electrical power of the diesel generators and providing power sharing among the critical electrical loads and essential electrical loads;

coupling PLC controllers of the main switchboard cabinets of the SRS electrical power distribution platforms through a third communication network and switching together from utility AC electrical power to diesel generator AC electrical power and back from the diesel generator AC electrical power to the utility AC electrical power such that all SRS electrical power distribution platforms are either on the diesel generator AC electrical power or on the utility AC electrical power;

coupling one or more batteries to each static UPS unit;

providing battery backup power to critical electrical loads when the SRS electrical power distribution platforms switch from the utility AC electrical power to the diesel generator AC electrical power;

coupling the SRS electrical power distribution platforms to a single AC utility source.

21. A shared resource electrical distribution system having two or more ring buses, comprising:
- three or more electrical power distribution platforms coupled to the ring buses;
- at least one critical electrical ring bus to supply conditioned continuous AC electrical power to critical electrical loads and at least one essential electrical ring bus to supply AC electrical power to essential electrical loads;
- where the critical electrical ring bus and the essential electrical ring bus are divided into multiple segments with each segment supplied electrical power from two or more of electrical power distribution platforms, and thus, the critical electrical loads in the shared resource electrical distribution system are formed into sets of critical electrical loads, each set of critical electrical loads supplied electrical power from its own segment of the critical electrical ring bus, and thus, the essential electrical loads in the shared resource electrical distribution system are formed into sets of critical electrical loads, each set of essential electrical loads supplied electrical power from its own segment of the essential electrical ring bus, accordingly, each set of the critical electrical loads is coupled to a shared critical electrical bus segment and is powered by at least two different electrical power distribution platforms, and each set of the essential electrical loads is coupled to a shared essential electrical bus segment and is powered by at least two different electrical power distribution platforms;
- one or more static uninterruptable power supply (UPS) units coupled to each electrical power distribution platform and configured to supply conditioned continuous power to the critical electrical loads, wherein each set of the critical electrical loads is coupled through a shared critical ring bus segment to the UPS units of two or more electrical distribution platforms and is configured to receive continuous conditioned power; and
- at least one control system associated with the UPS units of each electrical power distribution platform to communicate with each other over a communication and control network to synchronize a frequency and phase of a voltage being supplied by the UPS units to each critical electrical bus segment.

* * * * *